(12) United States Patent
Adkisson et al.

(10) Patent No.: US 7,436,917 B2
(45) Date of Patent: Oct. 14, 2008

(54) CONTROLLER FOR CLOCK SYNCHRONIZER

(75) Inventors: Richard W. Adkisson, Dallas, TX (US); Gary B. Gostin, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 760 days.

(21) Appl. No.: 10/901,773

(22) Filed: Jul. 29, 2004

(65) Prior Publication Data

US 2006/0023820 A1    Feb. 2, 2006

(51) Int. Cl.
*H04L 7/00* (2006.01)

(52) U.S. Cl. .................. 375/354; 713/400; 713/503

(58) Field of Classification Search ............. 375/362, 375/371, 373, 354; 713/400, 401, 500, 600, 713/601, 501, 502, 503; 327/3, 9
See application file for complete search history.

(56) References Cited

U.S. PATENT DOCUMENTS

| | | | |
|---|---|---|---|
| 5,347,559 A | 9/1994 | Hawkins et al. | |
| 5,721,886 A | 2/1998 | Miller | |
| 5,884,100 A * | 3/1999 | Normoyle et al. | 710/52 |
| 5,987,081 A * | 11/1999 | Csoppenszky et al. | 375/354 |
| 6,075,832 A | 6/2000 | Geannopoulos et al. | |
| 6,084,934 A | 7/2000 | Garcia et al. | |
| 6,114,915 A | 9/2000 | Huang et al. | |
| 6,134,155 A | 10/2000 | Wen | |
| 6,175,603 B1 | 1/2001 | Chapman et al. | |
| 6,246,275 B1 | 6/2001 | Wodnicki et al. | |
| 6,249,875 B1 | 6/2001 | Warren | |
| 6,326,824 B1 | 12/2001 | Hosoe et al. | |
| 6,369,624 B1 | 4/2002 | Wang et al. | |
| 6,393,502 B1 * | 5/2002 | Meyer et al. | 710/58 |
| 6,425,088 B1 * | 7/2002 | Yasukawa et al. | 713/400 |
| 6,529,083 B2 | 3/2003 | Fujita | |
| 6,782,064 B1 * | 8/2004 | Schwake | 375/354 |
| 6,799,280 B1 * | 9/2004 | Edenfield et al. | 713/400 |
| 7,058,840 B2 * | 6/2006 | Marx et al. | 713/500 |
| 2002/0051509 A1 | 5/2002 | Lindner et al. | |
| 2002/0124200 A1 * | 9/2002 | Govindaraman | 713/400 |
| 2002/0158671 A1 | 10/2002 | Wang et al. | |
| 2002/0199124 A1 | 12/2002 | Adkisson | |

* cited by examiner

*Primary Examiner*—Chieh M. Fan
*Assistant Examiner*—Aristocratis Fotakis

(57) ABSTRACT

A controller arrangement and method for effectuating data transfer between a first clock domain and a second clock domain. In one embodiment, inversion circuitry inverts a first clock signal associated with the first clock domain into an inverted first clock signal that is used in effectuating a SYNC pulse during coincident edges of the inverted first clock signal and a second clock signal associated with the second clock domain. Clock synchronizer controller circuitry operates responsive to sampled sync pulses based on the SYNC pulse to generate domain synchronizer control signals for effectuating data transfer between the first and second clock domains.

31 Claims, 15 Drawing Sheets

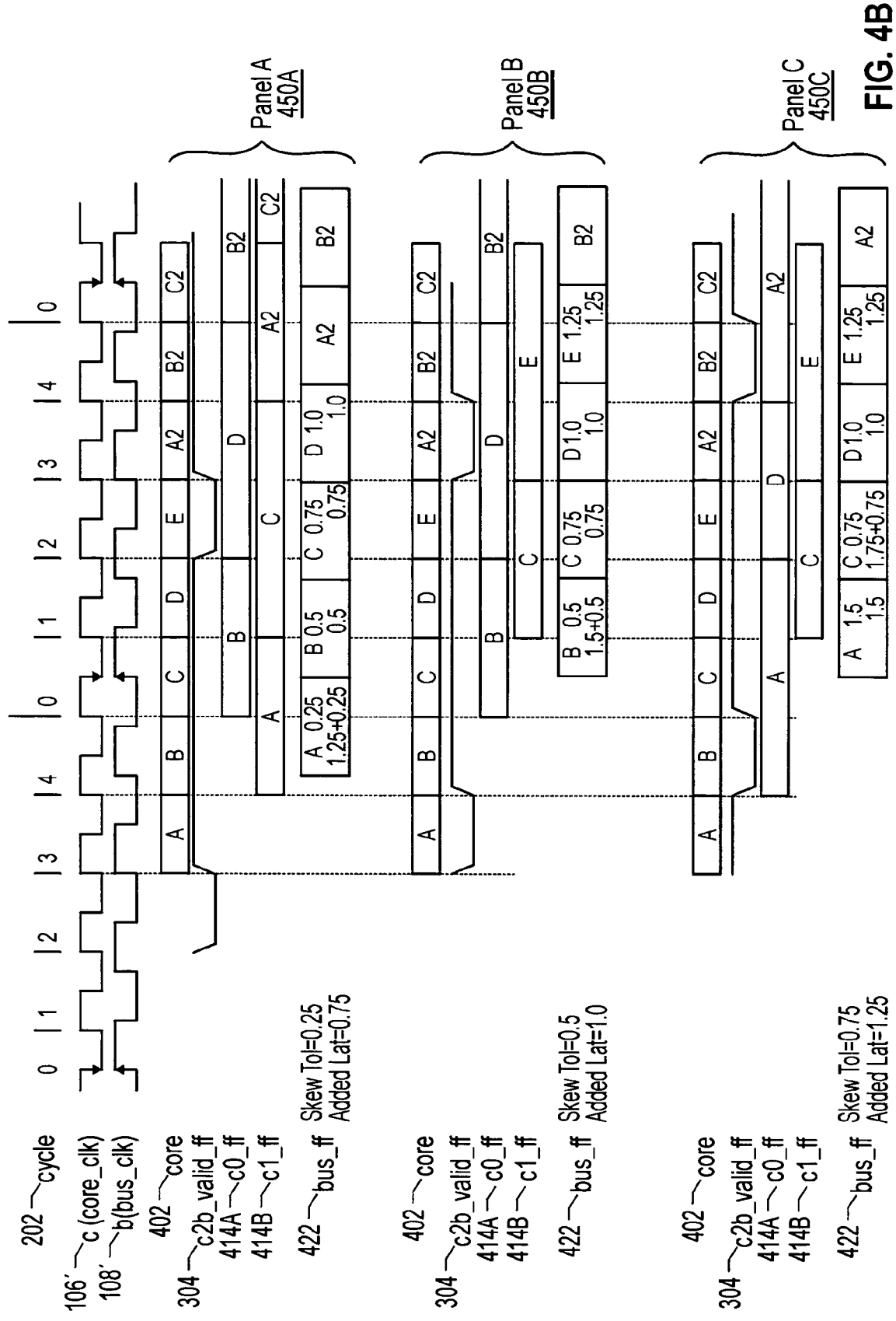

CONTROLLER FOR CLOCK SYNCHRONIZER

CROSS-REFERENCE TO RELATED APPLICATION(S)

This application discloses subject matter related to the subject matter disclosed in the following commonly owned co-pending patent applications: (i) "PROGRAMMABLE CLOCK SYNCHRONIZER," filed Jul. 30, 2003, application Ser. No. 10/630,159, in the name(s) of: Richard W. Adkisson; (ii) "CONTROLLER ARRANGEMENT FOR A PROGRAMMABLE CLOCK SYNCHRONIZER," filed Jul. 30, 2003, application Ser. No. 10/630,182, in the name(s) of: Richard W. Adkisson; (iii) "SYSTEM AND METHOD FOR SYNCHRONIZING MULTIPLE SYNCHRONIZER CONTROLLERS," filed Jul. 30, 2003, application Ser. No. 10/629,989, in the name(s) of: Richard W. Adkisson; (iv) "SYSTEM AND METHOD FOR MAINTAINING A STABLE SYNCHRONIZATION STATE IN A PROGRAMMABLE CLOCK SYNCHRONIZER," filed Jul. 30, 2003, application Ser. No. 10/630,297, in the name(s) of: Richard W. Adkisson; (v) "SYSTEM AND METHOD FOR COMPENSATING FOR SKEW BETWEEN A FIRST CLOCK SIGNAL AND A SECOND CLOCK SIGNAL," filed Jul. 30, 2003, application Ser. No. 10/630,317, in the name(s) of: Richard W. Adkisson; (vi) "PHASE DETECTOR FOR A PROGRAMMABLE CLOCK SYNCHRONIZER, " filed Jul. 30, 2003, application Ser. No. 10/630,298, in the name(s) of: Richard W. Adkisson; and (vii) "CLOCK SYNCHRONIZER," filed Jul. 29, 2004, application Ser. No. 10/901762, in the name(s) of: Richard W. Adkisson, Gary B. Gostin, and Christopher Greer, all of which are incorporated by reference herein.

BACKGROUND

Digital electronic systems, e.g., computer systems, often need to communicate using different interfaces, each running at an optimized speed for increased performance. Typically, multiple clock signals having different frequencies are utilized for providing appropriate timing to the interfaces. Further, the frequencies of such clock signals are generally related to one another in a predetermined manner. For example, a core or system clock running at a particular frequency ($F_C$) may be utilized as a master clock in a typical computer system for providing a time base with respect to a specific portion of its digital circuitry. Other portions of the computer system's digital circuitry (such as a bus segment and the logic circuitry disposed thereon) may be clocked using timing signals derived from the master clock wherein the derived frequencies ($F_D$) follow the relationship: $F_C/F_D \geq 1$.

Because of the asynchronous—although related—nature of the constituent digital circuit portions, synchronizer circuitry is often used in computer systems to synchronize data transfer operations across a clock domain boundary so as to avoid timing-related data errors. Such synchronizer circuitry is typically required to possess low latency (which necessitates precise control of the asynchronous clocks that respectively clock the circuit portions in two different clock domains). Despite the capabilities of existing clock synchronizer circuitry, further improvements are warranted as will be described below.

SUMMARY

A controller arrangement and method are disclosed that provide for effectuating data transfer between a first clock domain and a second clock domain. In one embodiment, inversion circuitry inverts a first clock signal associated with the first clock domain into an inverted first clock signal that is used in effectuating a SYNC pulse during coincident edges of the inverted first clock signal and a second clock signal associated with the second clock domain. Clock synchronizer controller circuitry operates responsive to sampled sync pulses based on the SYNC pulse to generate domain synchronizer control signals for effectuating data transfer between the first and second clock domains.

BRIEF DESCRIPTION OF THE DRAWINGS

FIG. 4B depicts a timing diagram associated with the synchronizer circuit shown in FIG. 4A, wherein the clock domains have a 5:4 frequency ratio;

DETAILED DESCRIPTION OF THE DRAWINGS

Figure 1A:
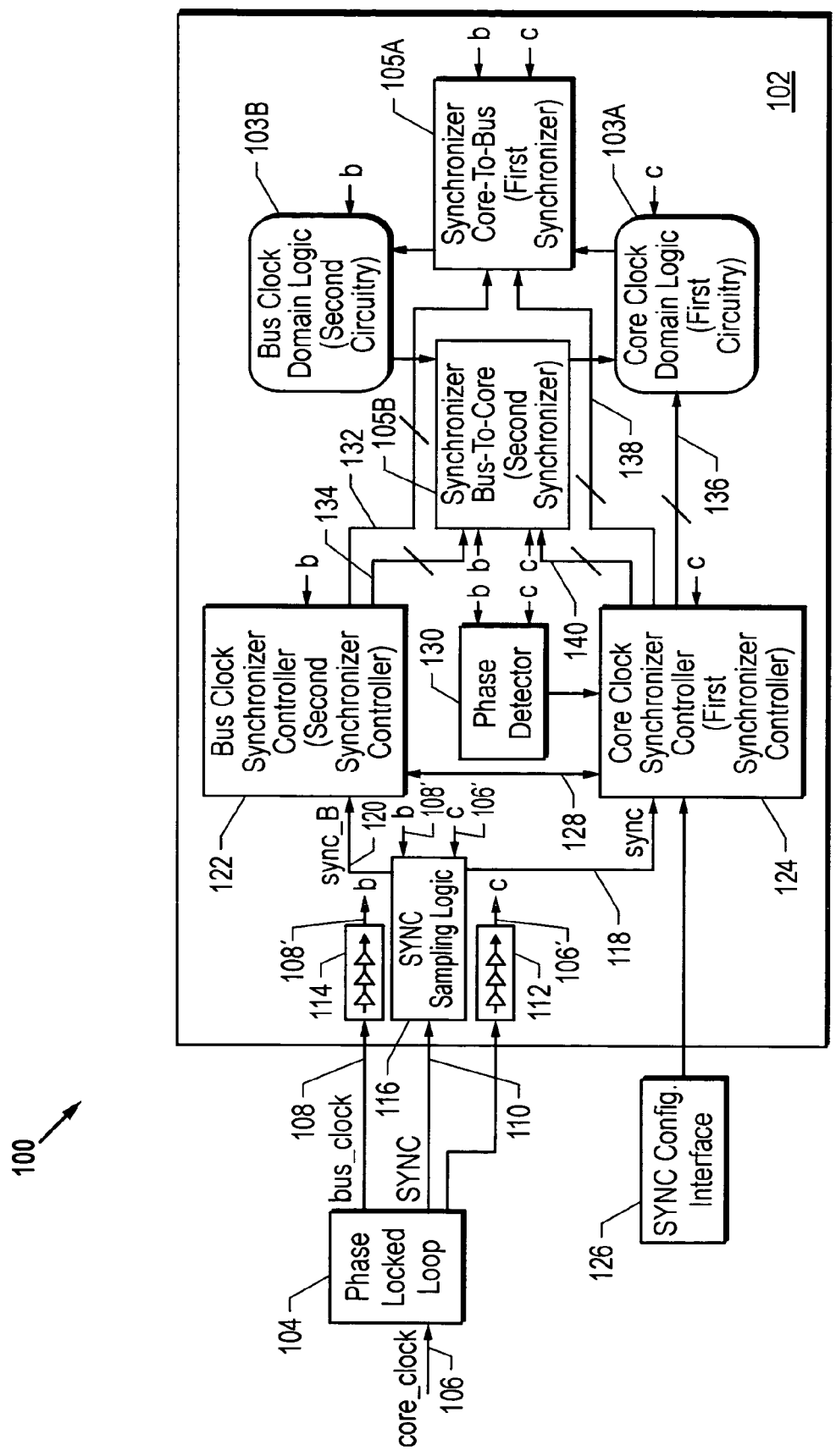
FIG. 1A depicts a block diagram of an embodiment of a synchronizer system for effectuating data transfer across a clock boundary.

In the drawings, like or similar elements are designated with identical reference numerals throughout the several views thereof, and the various elements depicted are not necessarily drawn to scale. Referring now to FIG. 1A, therein is depicted an embodiment of a synchronizer system 100 for effectuating data transfer across a clock boundary between a first clock domain (i.e., "fast clock domain") having N clock cycles and a second clock domain (e.g., "slow clock domain") having M clock cycles such that N/M≧1. Typically, M=(N− 1), and by way of exemplary implementation, the synchronizer system 100 may be provided as part of a computer system for transferring data between a faster core clock domain (e.g., operating with a core clock signal of 267 MHz) and a slower bus clock domain (e.g., operating with a bus clock signal of 214 MHz), with a 5:4 frequency ratio. Accordingly, for purposes of this present patent application, the terms "first clock" and "core clock" will be used synonymously with respect to a fast clock domain; likewise, the terms "second clock" and "bus clock" will be used with respect to a slow clock domain.

A phase-locked loop (PLL) circuit 104 is operable to generate a SYNC pulse 110 and a bus clock (i.e., second clock) signal 108 (designated as bus_clock) based on a core clock (i.e., first clock) signal 106 (designated as core_clock) provided thereto. As will be seen below, the SYNC pulse 110 provides a reference point for coordinating data transfer operations and is driven HIGH when the bus_clock and core_clock signals have coincident edges. Coincident edges may occur on the falling edge. of the core_clock signal and rising edge of the bus_clock signal. By way of another example, the coincident edges may occur on the rising edge of the core_clock signal and the falling edge of the bus_clock signal. The two clock signals 106, 108 and SYNC pulse 110 are provided to a synchronizer/controller block 102 that straddles the clock boundary between a first clock domain (i.e., core clock domain) and a second clock domain (i.e., bus clock domain) for effectuating data transfer across the boundary. Reference numerals 103A and 103B refer to circuitry disposed in the first and second clock domains, respectively, e.g., core clock domain logic and bus clock domain logic, that transmit and receive data therebetween as facilitated via synchronizers 105A and 105B, which will be described in greater detail hereinbelow.

Each of the core_clock and bus_clock signals 106, 108 is first provided to a respective clock distribution tree block for generating a distributed clock signal that is provided to various parts of the synchronizer/controller block 102. Reference numeral 112 refers to the clock distribution tree operable with the core_clock signal 106 to generate the distributed core_clock signal, which is labeled as "c" and shown with reference numeral 106' in FIG. 1. In the illustrated embodiment, the clock distribution tree 112 operates as inversion circuitry to invert the core_clock signal before distributing the core_clock signal. In particular, the clock distribution tree 112 may invert the core_clock signal by shifting the signal with a phase difference of 180°. Accordingly, it should be appreciated that the "c" designation depicted with reference numeral 106' is indicative of the inverted core_clock signal.

Reference numeral 114 refers to the clock distribution tree operable with the bus_clock signal 108 to generate the distributed bus_clock signal, which is labeled as "b" and shown with reference numeral 108' in FIG. 1. A SYNC sampling logic block 116 is operable responsive to the distributed clock signals 106', 108' and SYNC pulse signal 110, to generate a pair of sampled SYNC pulses that are forwarded to appropriate synchronizer controller circuitry. In one embodiment, the sampled SYNC pulses are manufactured as follows. The SYNC pulse 110 is sampled by three flip flop (FF) elements (not shown in FIG. 1), wherein the first two of the FF elements are clocked on the falling edge of the distributed core_clock, c 106' since the core_clock signal is inverted with respect to the SYNC signal. The third FF element is clocked on the rising edge of the distributed core_clock c 106'. As may be appreciated, sampling by multiple FF elements is effective in eliminating metastability associated with the SYNC pulse 110 (possibly arising due to the skew between the input signal, core_clock 106 and the output signal, SYNC 110). The sampled SYNC pulse in the core clock domain is designated as "sync" signal 118 in FIG. 1, which is provided to a first synchronizer controller (or, core clock synchronizer controller) 124 operating in the first clock domain.

With respect to the second clock domain (i.e., bus clock domain), the SYNC pulse 110 is sampled in the SYNC sampling logic block 116 by a single FF element (not shown in this FIG. ) that is clocked on the rising edge of the distributed bus_clock, b 108'. To signify that the sampling is done using the bus_clock, the sampled SYNC pulse is designated as "sync_B" signal 120, which is provided to a second synchronizer controller 122 operating in the second clock domain, also referred to as the bus clock synchronizer controller in FIG. 1.

The bus clock synchronizer controller 122 is operable responsive to the distributed bus_clock, b 108' and sampled sync_B pulse 120 to generate a plurality of synchronizer control signals, a portion of which signals are directed to a first synchronizer circuit means 105A operating to control data transfer from first circuitry 103A (i.e., core clock domain logic) to second circuitry 103B (i.e., bus clock domain logic). Reference numeral 132 refers to the signal path of this portion of control signals emanating from the bus clock synchronizer controller 122. Another portion of the synchronizer control signals generated by the bus clock synchronizer controller 122 are directed (via signal path 134) to a second synchronizer circuit means 105B operating to control data transfer from second circuitry 103B to first circuitry 103A. Consistent with the nomenclature used in the present patent application, the first and second synchronizer circuits may also be referred to as core-to-bus synchronizer and bus-to-core synchronizer circuits, respectively. In addition, the bus clock synchronizer controller 122 also generates a set of inter-controller control signals that are provided to the first synchronizer controller 124 (i.e., core clock synchronizer controller) such that both controllers can work together. Reference numeral 128 refers to the signal path of the inter-controller control signal(s) provided to the core clock synchronizer controller 124.

Similar to the operation of the bus clock synchronizer controller 122, the core clock synchronizer controller 124 is operable responsive to the distributed core_clock, c 106', inter-controller control signals, and sampled sync pulse 118 to generate a plurality of synchronizer control signals, a portion of which signals are directed to the first synchronizer circuit means 105A and another portion of which signals are directed to the second synchronizer circuit means 105B. Reference numerals 138 and 140 refer to the respective signal paths relating to these control signals. The core clock synchronizer controller 124 also generates data transmit/receive control signals that are provided to the core clock domain logic 103A via signal path 136 in order that the core clock domain logic 103A knows when it can send data to the bus clock domain logic 103B (i.e., valid TX operations) and when it can receive data from the bus clock domain logic 103B (i.e., valid RX operations).

All control signals from the bus clock synchronizer controller 122 to the first and second synchronizers 105A, 105B are staged through one or more FF elements that are clocked with the sampled bus_clock, b 108'. Likewise, the control signals from the core clock synchronizer controller 124 are staged through a number of FF elements clocked with the sampled inverted core_clock, c 106', before being provided to the various parts of the synchronizer system 100. Accordingly, as will be seen in greater detail below, the various control signals associated with the synchronizer system 100 may be designated with a signal label that is concatenated with a "_ff" or "_ff_B" suffix to indicate the registration process by the sampled core_clock or the sampled bus_clock.

A phase detector 130 detects phase differences (i.e., skew) between the two clock signals by operating responsive to the sampled bus_clock and core_clock signals. This information is provided to the core clock synchronizer controller 124, which can compensate for the skew or determine appropriate times to coordinate with the bus clock synchronizer controller 122.

Where the bus clock signal is stable with respect to the SYNC pulse, the inter-controller clock relationship control signals are generated by the bus clock synchronizer controller 122 that provide information as to the frequency ratio of the first and second clock signals as well as related clock sequence information, which are transmitted to the core clock synchronizer controller 124 for synchronizing its core clock signal in accordance therewith, as will be seen in greater detail below. On the other hand, where the core clock signal is stable with respect to the SYNC pulse, the inter-controller clock relationship control signals may be generated by the core clock synchronizer controller 124 for transmission to the bus clock synchronizer controller 122 so that both synchronizer controllers may be appropriately synchronized. Further, a configuration interface 126, labeled as SYNC_Config in FIG. 1A, is provided as part of the synchronizer system 100 for configuring the core clock synchronizer controller 124 so that it may be programmed for different skew tolerances, latencies and modes of operation. In one embodiment, the configuration interface 126 may be implemented as a register having a plurality of bits. In another embodiment, a memory-based setting, e.g., EPROM-stored settings, may be provided as a SYNC configuration interface.

As set forth above, the synchronizer system 100 may be programmed for different skew tolerances and latencies, so that data transfer at high speeds can proceed properly even where there is a high skew or requirement of low latency. Further, the synchronizer system 100 can operate with any two clock domains having a ratio of N first clock cycles to M second clock cycles, where N/M≧1.

Figure 1B:
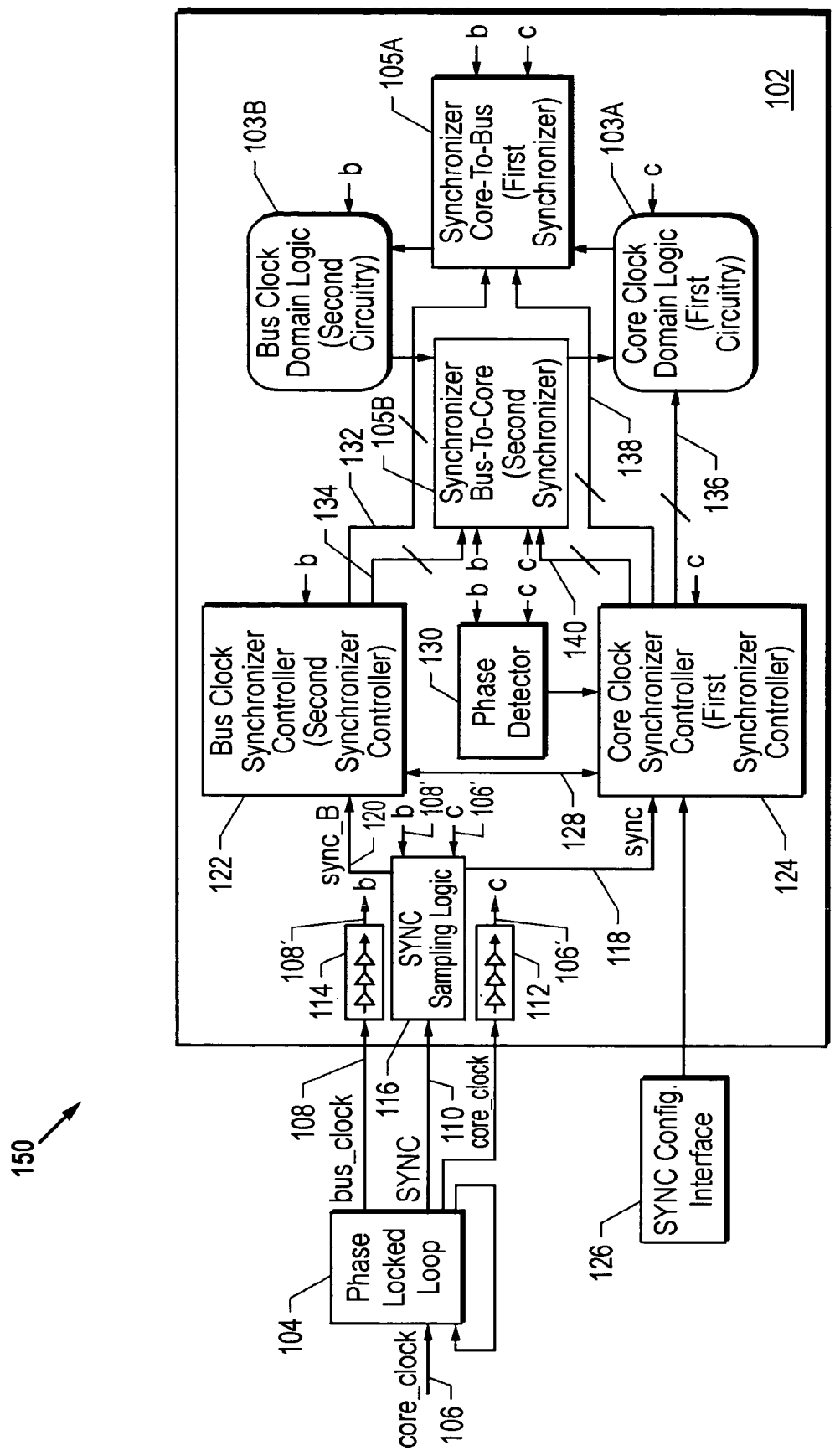
FIG. 1B depicts a block diagram of a further embodiment of a synchronizer system for effectuating data transfer across a clock boundary.

FIG. 1B depicts a block diagram of a further embodiment of a synchronizer system 150 for effectuating data transfer across a clock boundary. The components of the synchronizer system 150 are essentially the same as the components of the synchronizer system 100 of FIG. 1A as indicated by the common reference numerals. As discussed, in the system 100, the inverted core_clock signal c 106' is generated by the clock distribution tree 112. In the system 150, however, the inverted core_clock signal c 106' is generated by the phase locked loop 104. Accordingly, it should be appreciated that either the phase locked loop or a clock signal distribution tree may effectuate appropriate inversion circuitry that is operable to invert the core clock signal which is then utilized in the generation of a SYNC pulse during coincident edges of the inverted core clock signal and the non-inverted bus clock signal.

Figure 2:
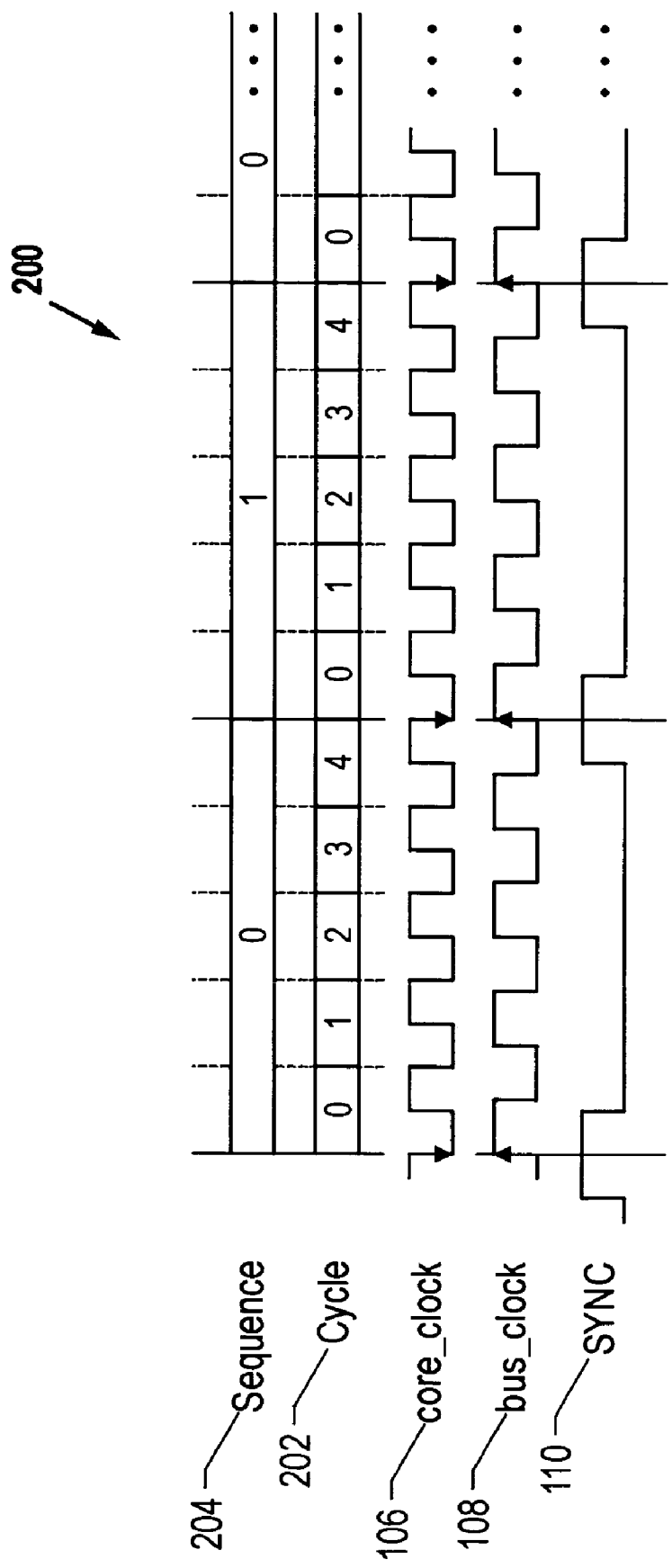
FIG. 2 depicts a timing diagram of two clock domains having a 5:4 frequency ratio wherein the synchronizer system of FIG. 1A or FIG. 1B may be utilized for effectuating data transfer across the clock boundary.

Referring now to FIG. 2, depicted therein is a timing diagram 200 associated with two clock domains having a 5:4 frequency ratio. By way of example, the core_clock signal 106 is provided as the fast clock and the bus_clock signal 108 is provided as the slow clock. Accordingly, for every five ticks of the core_clock, there are four ticks of the bus_clock. As alluded to before, the SYNC pulse 110 is generated when a falling edge of the core_clock signal 106 coincides with a rising edge of the bus_clock signal 108, which commences a timing sequence window 204 for the transfer of data, that may comprise k-bit wide data (k≧1), from one clock domain to the other clock domain. It should be appreciated, however, that the teachings of the present patent application are also applicable to instances wherein a falling edge of the bus_clock signal 108 coincides with a rising edge of the core_clock signal 106. A cycle count 202 refers to the numbering of core_clock cycles in a particular timing sequence 204.

As pointed above, the SYNC pulse 110 is driven HIGH on coincident edges of the clock signals and the data transfer operations across the clock boundary between the two clock domains are timed with reference to the SYNC pulse. In a normal condition where there is no skew (or, jitter, as it is sometimes referred to) between the clock signals, the coincident edges occur on the coincident edges of the first cycle (cycle 0) as shown in FIG. 2. Since there are five core_clock cycles and only four bus_clock cycles, the first clock domain circuitry cannot transmit data during one cycle, resulting in what is known as a "dead tick," as the second clock domain circuitry does not have a corresponding time slot for receiving it. Typically, the cycle that is least skew tolerant is the one where data is not transmitted. Likewise, because of an extra cycle (where the data is indeterminate and/or invalid), the first clock domain circuitry cannot receive data during one cycle. Again, it is the cycle with the least skew tolerance during which the data is not received by the first clock domain circuitry.

Skew between the clock signals can cause, for example, a variance in the positioning of the SYNC pulse which affects the data transfer operations between the two domains. In the exemplary 5:4 frequency ratio scenario set forth above, if the bus_clock 108 leads the core_clock 106 by a quarter cycle for instance, then instead of the edges being coincident at the start of cycle 0, they will be coincident at the start of cycle 1. In similar fashion, if the bus_clock signal lags the core_clock signal by a quarter cycle, the edges will be coincident at the start of the last cycle (i.e., cycle 4). Regardless of the skew between the clock cycles, however, there will be one cycle where data cannot be sent and one cycle where data cannot be received, from the perspective of the core clock domain circuitry.

Figure 3:
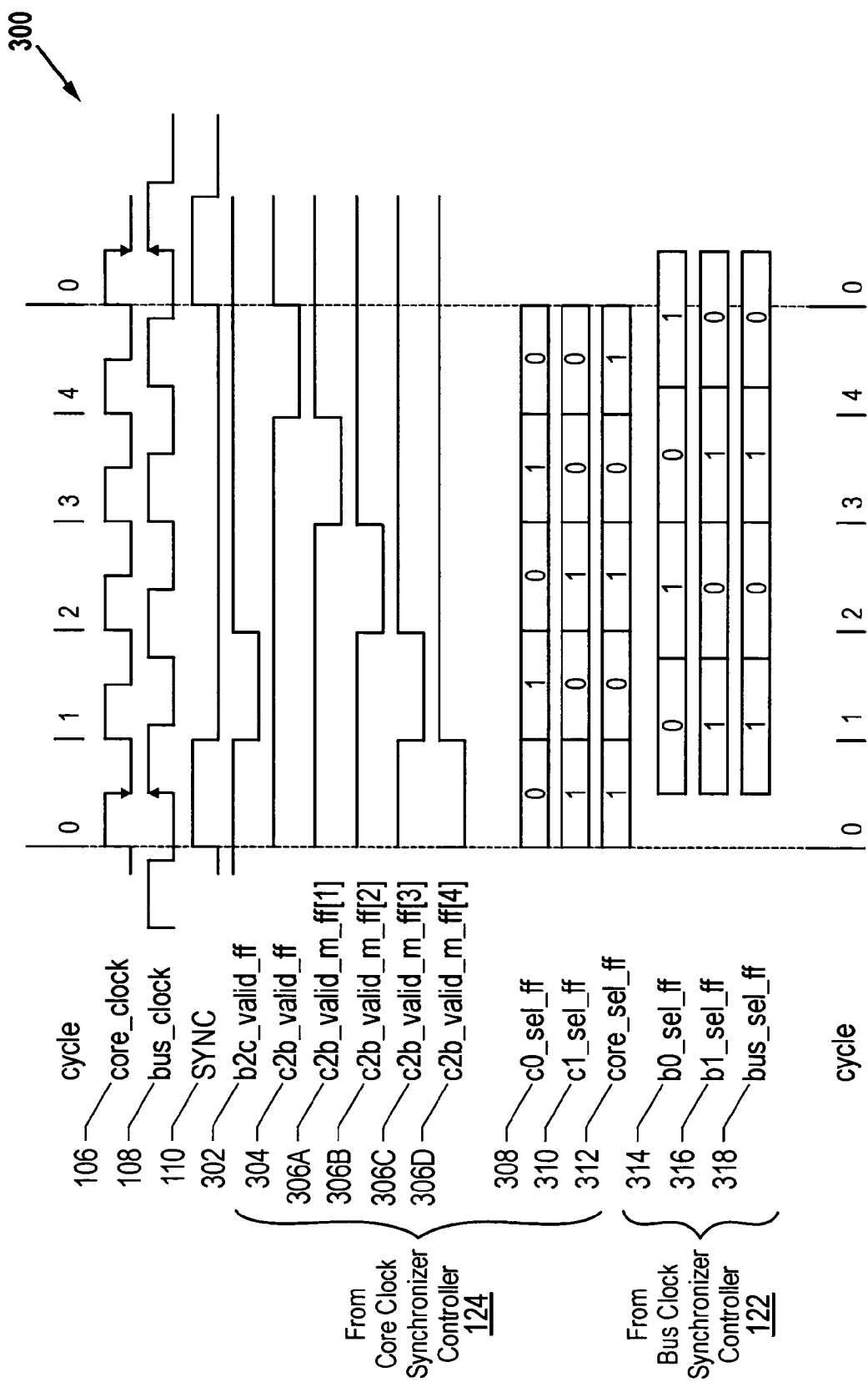
FIG. 3 depicts a timing diagram of the various control signals associated with the synchronizer system for transferring data between two clock domains having a 5:4 frequency ratio.

FIG. 3 depicts a timing diagram 300 of the various control signals associated with an embodiment of the programable synchronizer system 100 for transferring data between two clock domains having 5:4 frequency ratio. The clock cycles 106, 108 and SYNC pulse 110 are depicted again for showing the temporal relationship among the control signals. Reference numeral 302 refers to a b2 c_valid_ff signal (active HIGH) that is generated by the core clock synchronizer controller 124 for specifying one of the five cycles during which the core clock domain circuitry 103A cannot receive data supplied by the bus clock domain circuitry 103B. As illustrated, data may be received from the bus clock domain circuitry 103B in cycles 0 and 2-4, but not in cycle 0. Likewise, since there is a dead tick between the core and bus clocks, the core synchronizer controller 124 also provides a c2 b_valid_ff signal 304 to indicate when the core clock domain circuitry 103A can validly transmit data to the bus clock domain circuitry 103B. Further a series of "advance warning" signals (each being active HIGH), c2b_valid_m_ff[4:1] 306A-306D, are provided for indicating a number of cycles ahead of time as to when the dead cycle occurs between the first and second clock signals during which the core clock domain circuitry 103A cannot transmit data. For instance, c2b_valid_ff 304 is asserted LOW in cycle 4, indicating that the core clock domain circuitry 103A cannot send data in that particular cycle. Core clock domain data during that cycle may have to be buffered accordingly before it is transmitted in a subsequent cycle. Advance warning as to the occurrence of the dead cycle may be given ahead by one cycle (i.e., in cycle 3, as indicated by c2b_valid_m_ff[1] 306A that is asserted LOW in cycle 3), by two cycles (i.e., in cycle 2, as indicated by c2 b_valid_m_ff[2] 306B that is asserted LOW in cycle 2), by three cycles (i.e., in cycle 1, as indicated by c2b_valid_m_ff[3] 306C that is asserted LOW in cycle 1), and by four cycles (i.e., in cycle 0, as indicated by c2 b_valid-_m_ff[4] 306D that is asserted LOW in cycle 0).

The core clock synchronizer controller 124 also generates another set of control signals (c0_sel_ff 308, c1_sel_ff 310, and core_sel_ff 312) that control the data loading and data capture circuitry of the synchronizers 105A, 105B. Likewise, the bus clock synchronizer controller 122 generates a set of control signals (b0_sel_ff 314, b1_sel_ff 316 and bus_sel_ff 318) that also control the data loading and data capture circuitry of the synchronizers 105A, 105B, which are described below.

Figure 4A:
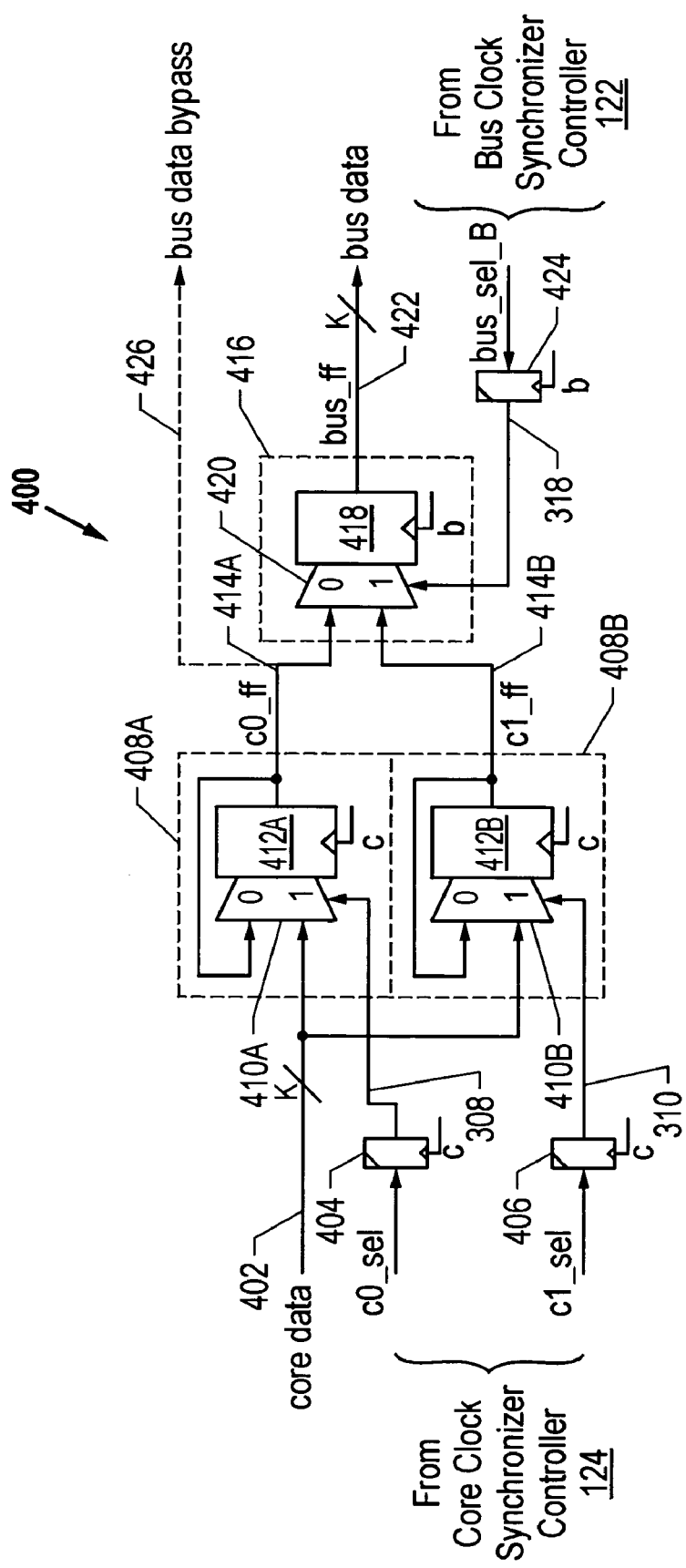
FIG. 4A depicts a block diagram of an embodiment of a synchronizer circuit for transferring data from a first clock domain (i.e., "fast clock domain" or "core clock domain") to a second clock domain (i.e., "slow clock domain" or "bus clock domain")

FIG. 4A depicts a block diagram of an embodiment of a synchronizer circuit 400 for transferring data from a first clock domain to a second clock domain. It should be recognized that the synchronizer circuit 400 is a particular embodiment of the first synchronizer (i.e., core-to-bus synchronizer) 105A shown in FIG. 1 that is adapted to operate with the various control signals described hereinabove. Data 402 from the first clock domain (i.e., core data from the core clock domain logic) is provided on a k-bit wide data path to the input side of the synchronizer circuit 400 that essentially comprises a first TRANSMIT multiplexer-register (MUXREG) block 408A and a second TRANSMIT MUXREG block 408B. Each of the TRANSMIT MUXREG blocks includes a 2:1 MUX coupled to a register that is clocked by the first clock signal (i.e., the sampled and inverted core_clock, c 106'), wherein the k-bit wide data is provided to the input of the 2:1 MUX that is selected when a MUX control signal is driven HIGH. The other input of the 2:1 MUX is coupled via a feedback path to the output of the register associated therewith. In the embodiment shown in FIG. 4A, register 412A and associated 2:1 MUX 410A form the first TRANSMIT MUXREG block 408A, wherein the 2:1 MUX 410A is controlled by c0_sel 308 (generated by the core clock synchronizer controller 124) that is staged through FF 404. Likewise, register 412B and associated 2:1 MUX 410B form the second TRANSMIT MUXREG block 408B, wherein the 2:1 MUX 410B is controlled by c1_sel 310 (also generated by the core clock synchronizer controller 124) that is staged through FF 406. Each of the FF elements 404 and 406 is clocked by the sampled/inverted core_clock, c 106'.

Each of the outputs of the two TRANSMIT MUXREG blocks 408A, 408B, i.e., c0_ff 414A and c1_ff 414B, respectively, is provided to a RECEIVE MUXREG block 416 on the output side of the synchronizer circuit 400, which includes a 2:1 MUX 420 and a register 418 that is clocked by the second clock signal (i.e., the sampled bus_clock, b 108'). MUX control is provided by bus_sel_B 318 that is generated by the bus clock synchronizer controller 122 and staged through FF 424. The output of the RECEIVE MUXREG block 416 (i.e., bus_ff) is the k-bit wide data received in the bus clock domain logic as bus data 422. It should be apparent that although single instances of the various MUXREG blocks are shown in FIG. 4A, there are in fact k such blocks in the data path through the core-to-bus synchronizer 400 to synchronize the transfer of all k data signals (of the k-bit wide data, k≧1) from the core clock domain logic to the bus clock domain logic.

Bus data bypass 426 provides a bypass in instances wherein the synchronizer circuit 400 is utilized with 1:1 core clock domain to bus clock domain frequency ratio. In this embodiment, the control signals are static. For example, the c0_sel signal always equals 1 and bus_sel_B signal always equals 0. The c1_ff path is not used at all and, accordingly, the output of the RECEIVE MUXREG block 416 is always the c0_ff signal. The bus data bypass 426 bypasses the RECEIVE MUXREG block 416 to output the c0_ff signal as the bus data signal, thereby saving half a clock signal. Hence, by inverting the core clock signal, a lower latency clock synchronizer for the 1:1 mode is provided without detrimentally affecting the latency in the N+1:N modes. Further, by inverting the core clock signal for all clock ratios, a low latency 1:1 mode is achieved without having to make board wiring changes.

FIG. 4B depicts a timing diagram associated with the core-to-bus synchronizer embodiment 400 wherein a 5:4 relationship exists between the core clock and bus clock domains. Further, the timing diagram illustrates the temporal relationship of the various control signals associated therewith and the effect of different skew tolerances and latencies. A complete sequence and a portion of a sequence of core data 402 are exemplified as [A,B,C,D,E] and [A2,B2,C2], respectively. Each data block is k-bit wide and available for a particular clock cycle, 0 through 4. Different skew tolerances and latency factors may be programmed by controlling when the RECEIVE MUXREG block 416 loads from c0_ff 414A or c1_ff 414B. In Panel A 450A, data transfer from the core domain circuitry to the bus domain circuitry is shown where a condition involving skew tolerance of 0.25 and added latency of 0.75 is programmed. Under these conditions, the core clock synchronizer controller 124 generates the c2b_valid_ff 304 signal such that there is no valid TX operation on cycle 2 (i.e., the third cycle). Accordingly, the TRANSMIT MUXREG blocks 408A and 408B respectively load the data portions [A,B] and [C,D] in each sequence, as controlled by c0_sel 308 and c1_sel 310. The data portion in cycle 2, [E], is not sent, which may be buffered and/or transmitted subsequently on a separate data path. The RECEIVE MUXREG block 416 alternatively loads from c0_ff 414A (for the [B,D] portion) and c1_ff 414B (for the [A,C] portion) under the control of bus_sel_B 318 from the bus clock synchronizer controller 122. The data from the RECEIVE MUXREG block 416 is clocked out using the sampled bus-_clock, b 108', as bus_ff 422 (i.e., bus data), the sequences being [A,B,C,D] and [A2,B2,C2,D2].

Likewise, in Panels 450B and 450C, data transfers involving skew tolerance of 0.5 and added latency of 1.0 and skew tolerance of 0.75 and added latency of 1.25 are respectively shown. Under these conditions, the core clock synchronizer controller 124 determines that data transmit operations in cycle 3 and cycle 4, respectively, are invalid. Accordingly, c2b_valid_ff 304 (asserted LOW in cycle 3) and c2 b_valid_ff 304 (asserted LOW in cycle 4) are provided by the core clock synchronizer controller to indicate that data portion [A] and data portion [B] cannot be transmitted. As a result, the transmitted bus data sequences are [B,C,D,E]/[B2,C2,D2,E2]/ . . .

and [A,C,D,E]/[A2,C2,D2,E2]/ . . . , respectively, under the two sets of skew/latency combinations illustrated.

Figure 4C:
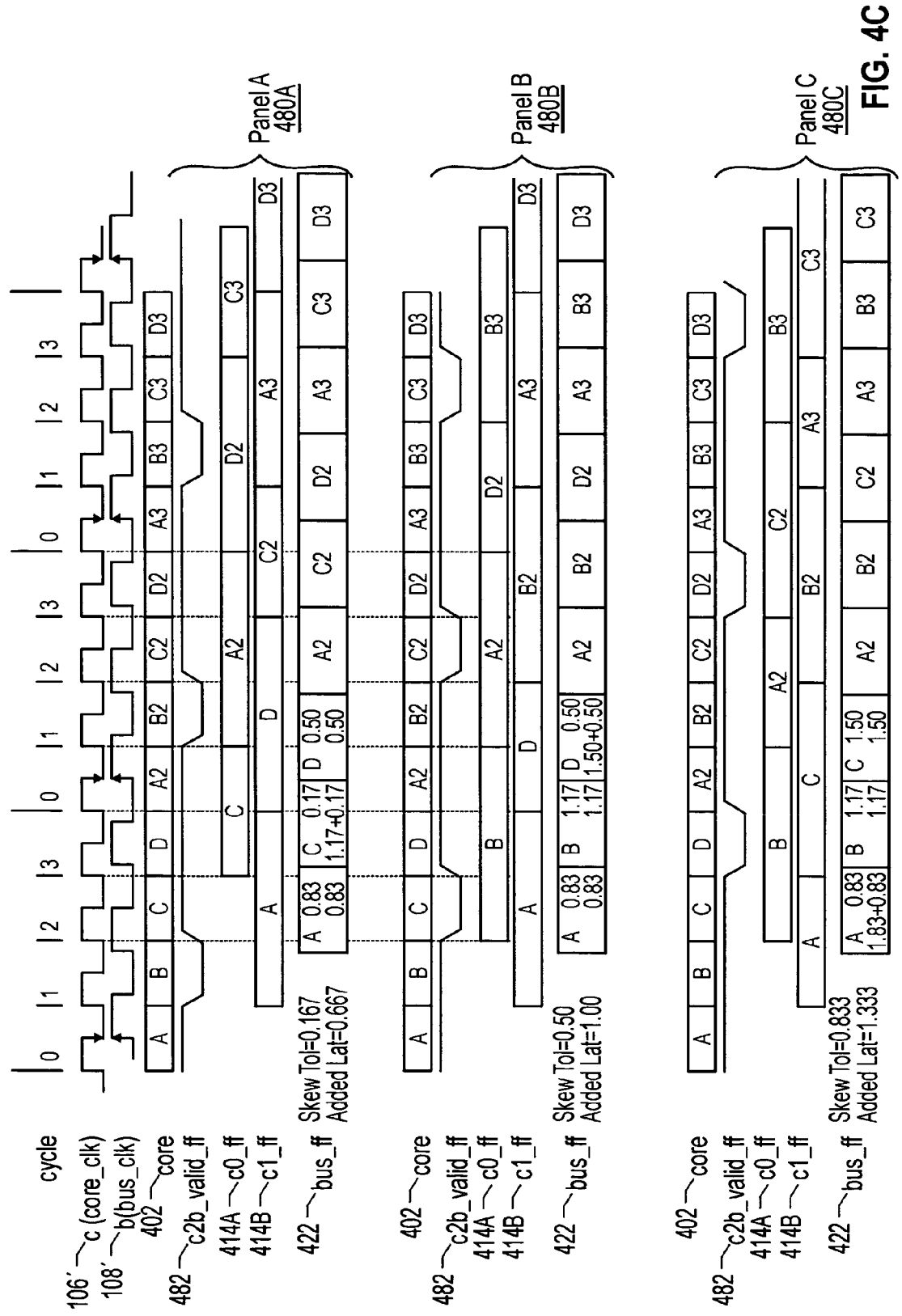
FIG. 4C depicts a timing diagram associated with the synchronizer circuit shown in FIG. 4A, wherein the clock domains have a 4:3 frequency ratio.

FIG. 4C depicts a timing diagram associated with the core-to-bus synchronizer embodiment 400 which illustrates the temporal relationship of the various control signals associated therewith and the effect of different skew tolerances and latencies in the context of a 4:3 clock ratio. Three sequences of core data 402, [A,B,C,D], [A2,B2,C2,D2], and [A3,B3,C3,D3], are exemplified, each data block being k-bit wide and available for a particular clock cycle, 0 through 3, as indicated by the cycle count. Similar to Panels 450A-450C, Panels 480A-480C illustrate data transfers involving various skews and latency conditions such as, e.g., skew tolerance of 0.167 and added latency of 0.667, skew tolerance of 0.50 and added latency of 1.00, and skew tolerance of 0.833 and added latency of 1.333, respectively. Under these conditions, the core clock synchronizer controller 124 determines that data transmit operations in cycle 1, cycle 2 and cycle 3, respectively, are invalid. Accordingly, the appropriate c2b_valid_ff signals, which are generically represented by the reference numeral 482, are provided by the core clock synchronizer controller to indicate that particular data portions cannot be transmitted. As a result, the transmitted bus data sequences are [A,C,D]/[A2,C2,D2]/[A3,C3,D3], [A,B,D]/[A2,B2,D2]/[A3,B3,D3], and [A,B,C]/[A2,B2,C2]/[A3,B3,C3], respectively, under the three sets of skew/latency combinations illustrated.

Figure 4D:
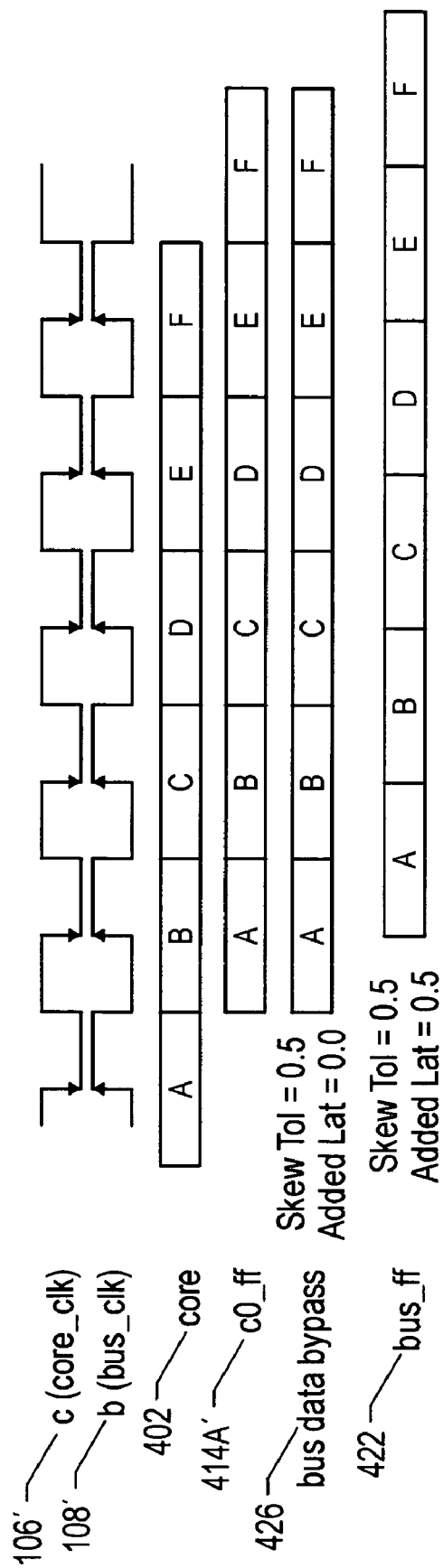
FIG. 4D depicts a timing diagram associated with the synchronizer circuit shown in FIG. 4A, wherein the clock domains have a 1:1 frequency ratio.

FIG. 4D depicts a timing diagram associated with the core-to-bus synchronizer embodiment 400 which illustrates a 1:1 ratio between the clock domains wherein the sequence of core data 402 is exemplified as [A] [B] [C] [D] [E] [F]. Data transfers involving both the bus data bypass 426 and the bus_ff signal 422 are depicted. As illustrated, the bus data bypass 426 involves a skew tolerance of 0.5 and added latency of 0.0 whereas the bus_ff signal involves a skew tolerance of 0.50 and added latency of 0.5. Hence, by utilizing the bus data bypass 426 in the synchronizer embodiment 400 for the 1:1 mode, half-a-cycle of latency is achieved over using a non-inverted core clock signal with no bus data bypass.

Figure 5A:
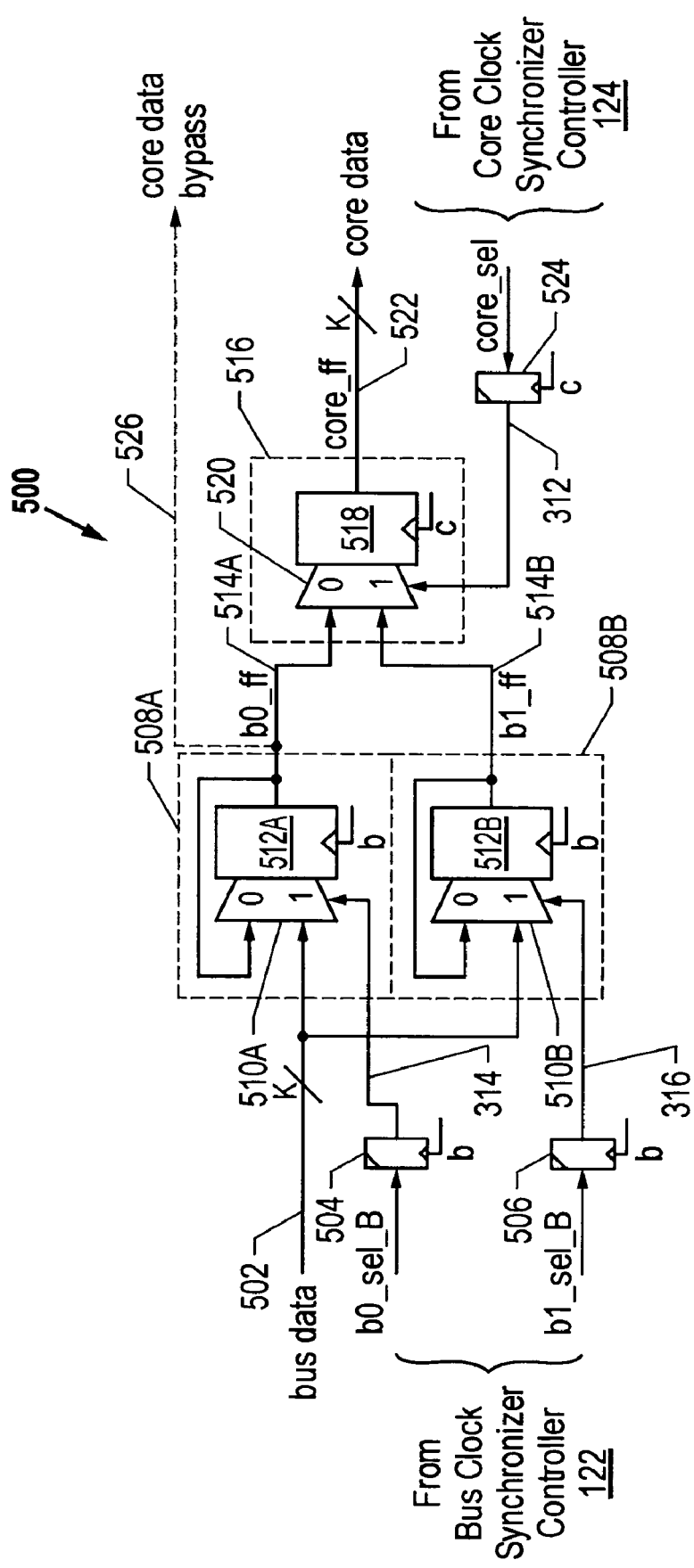
FIG. 5A depicts a block diagram of an embodiment of a synchronizer circuit for transferring data from the second clock domain (i.e., "slow clock domain" or "bus clock domain") to the first clock domain (i.e., "fast clock domain" or "core clock domain")

Referring now to FIG. 5A, depicted therein is a block diagram of an embodiment of a synchronizer circuit 500 for transferring data from a bus clock domain to a core clock domain, wherein the core and bus clock domains have a 5:4 frequency ratio. Again, those skilled in the art will recognize that the synchronizer circuit 500 is a particular embodiment of the second synchronizer (i.e., bus-to-core synchronizer) 105B shown in FIG. 1 that is adapted to operate with the various control signals described hereinabove with particular reference to FIG. 3. Further, it should be apparent that the physical circuitry of the bus-to-core synchronizer 500 is essentially similar to that of the core-to-bus synchronizer 400 set forth in detail above, but for being wired with different control signals, appropriately generated by the synchronizer controllers.

Data 502 from the second clock domain (i.e., bus data from the bus clock domain logic) is provided on a k-bit wide data path to the input side of the synchronizer circuit 500 that comprises a pair of TRANSMIT MUXREG blocks 508A, 508B disposed in the bus clock domain. Each of the TRANSMIT MUXREG blocks includes a 2:1 MUX coupled to a register that is clocked by the second clock signal (i.e., the sampled bus_clock, b 108'), wherein the k-bit wide bus data 502 is provided to the input of the 2:1 MUX that is selected when a MUX control signal is driven HIGH. The other input of the 2:1 MUX is coupled via a feedback path to the output of the register associated therewith. In the embodiment shown in FIG. 5A, register 512A and associated 2:1 MUX 510A form the first TRANSMIT MUXREG block 508A disposed in the second clock domain, wherein the 2:1 MUX 510A is controlled by b0_sel_B 314 (generated by the bus clock synchronizer controller 122) that is staged through FF 504 (=b0_sel_ff). Likewise, register 512B and associated 2:1 MUX 510B form the second TRANSMIT MUXREG block 508B disposed in the second clock domain, wherein the 2:1 MUX 510B is controlled by b1_sel_B 316 (also generated by the bus clock synchronizer controller 122) that is staged through FF 506 (=b1_sel_ff). Each FF 504, 506 is clocked by the sampled bus_clock, b 108'.

The outputs of the two TRANSMIT MUXREG blocks 508A, 508B, i.e., b0_ff 514A and b1_ff 514B, respectively, are provided to a RECEIVE MUXREG block 516 on the output side of the synchronizer circuit 500 (i.e., disposed in the first clock domain), which includes a 2:1 MUX 520 and a register 518 that is clocked by the first clock signal (i.e., the sampled and inverted core_clock, c 106'). MUX control is provided by core_sel 312 that is generated by the core clock synchronizer controller 124 and staged through FF 524. The output of the RECEIVE MUXREG block 516 (i.e., core_ff) is the k-bit wide data received in the core clock domain logic as core data 522.

Core data bypass 526 provides a bypass in instances wherein the synchronizer circuit 500 is utilized with 1:1 frequency ratio. In this embodiment, the control signals are static and, more specifically, the b0_sel_B signal =1 and core_sel =0. Accordingly, the output of the RECEIVE MUXREG block 516 is always the b0_ff signal. The core data bypass 526 bypasses the RECEIVE MUXREG block 516 to output the b0_ff signal as the core data signal, thereby saving half-a-clock signal as will be illustrated below in further detail.

Figure 5B:
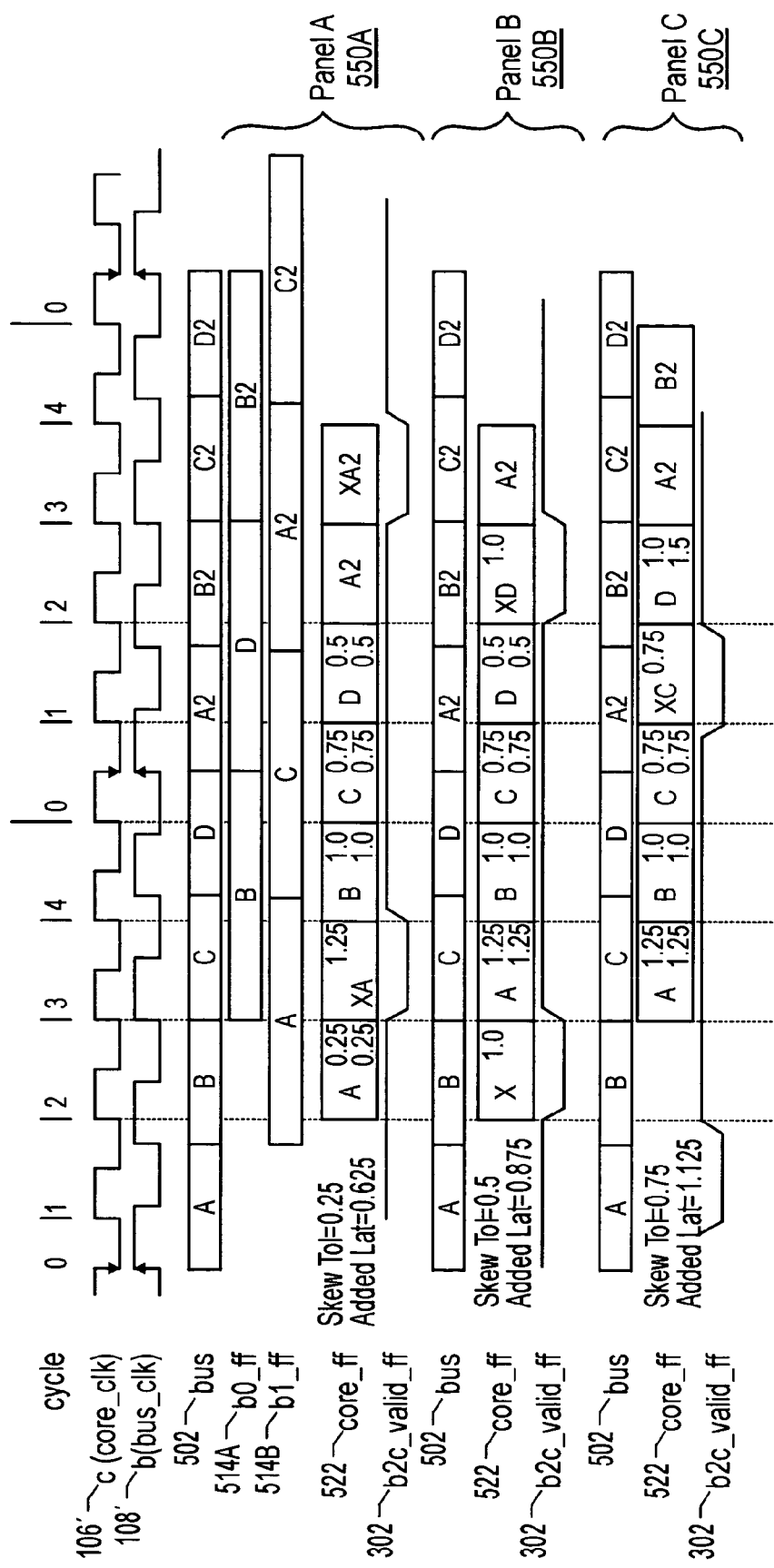
FIG. 5B depicts a timing diagram associated with the synchronizer circuit shown in FIG. 5A, wherein the clock domains have a 5:4 frequency ratio.

Again, it will be recognized that in actual implementation, the synchronizer embodiment 500 shown in FIG. 5A may include multiple instances of the various MUXREG blocks to synchronize the transfer of all k data signals (of the k-bit wide bus data, $k \geq 1$) from the bus clock domain logic to the core clock domain logic. FIG. 5B depicts a timing diagram associated with the bus-to-core synchronizer embodiment 500 which illustrates the temporal relationship of the various control signals associated therewith and the effect of different skew tolerances and latencies. Two sequences of bus data 502, [A,B,C,D] and [A2,B2,C2,D2], are exemplified, each block being k-bit wide and available for a particular bus clock cycle, 0 through 3, i.e., data block [A] in cycle 0, data block [B] in cycle 1, data block [C] in cycle 2, and data block [D] in cycle 3. Different skew tolerances and latency factors may be programmed by controlling when the RECEIVE MUXREG block 516 loads from b0_ff 514A or b1_ff 514B. In 5:4 mode, for example, the RECEIVE MUXREG block 516 loads five times but since only four data transfers can come from the bus domain, only four will be used (the extra cycle having an unused data portion, marked with an X in the Panels 550A-550C).

As shown in FIG. 5B, bus data 502 is stored in the TRANSMIT MUXREG blocks where each loads alternatively, under the control of b0_sel_B 314 and b1_sel_B 316, on every other bus_clock. Also, each TRANSMIT MUXREG block holds the data for two bus clocks. Accordingly, the first data block [A] is stored in TRANSMIT MUXREG 512B, the second data block [B] in TRANSMIT MUXREG 512A, the third data block [C] in TRANSMIT MUXREG 512B, and finally, the fourth data block [D] in TRANSMIT MUXREG 512A. The output of the two TRANSMIT MUXREG blocks 512A and 512B, therefore, comprises, data portions [B,D] as b0_ff 514A and [A,C] as b1_ff 514B.

In Panel A 550A, data transfer from the bus domain circuitry to the core domain circuitry is shown where a condition involving skew tolerance of 0.25 and added latency of 0.625 is programmed. Skew tolerance, which is measured in core clock cycles in this case, is defined as the minimum distance between data sample (i.e., core_ff) and changing data input (i.e., b0_ff or b1_ff). Added latency is also measured in core clock cycles, obtained by averaging the values associated with the four data blocks (from end of bus to core_ff). Actual latency is determined as one bus_clock cycle plus the added latency, which in 5:4 mode translates to 1:25 core_clock cycles plus the added latency.

As shown in Panel A 550A, which exemplifies the best latency condition but with the worst skew tolerance, the core clock synchronizer controller 124 generates the b2c_valid_ff 302 signal such that there is no valid RX operation on cycle 3 of the core_clock (i.e., its fourth cycle). The output of the RECEIVE MUXREG 516, i.e., core_ff 522, first loads data block [A] in cycle 2 from b1_ff 514B, then repeats the same data block as [XA] in the invalid/unused cycle 3 slot, after which data block [B] is loaded from b0_ff 514A during cycle 4. Thereafter, data blocks [C] and [D] are loaded from b1_ff 514B and b0_ff 514A during valid cycle 0 and 1 of the next sequence, respectively. The same pattern repeats for the next block of data, i.e., [A2]-[D2].

Panel B 550B of FIG. 5B exemplifies the programming mode with the next best latency condition (added latency=0.875) which has the next best skew tolerance (=0.5 core_clock cycles). Under these conditions, the core clock synchronizer controller 124 generates b2c_valid_ff signal, which is generically referred to by reference numeral 302, such that it is driven LOW in the third core_clock cycle (i.e., cycle 2). The output of the RECEIVE MUXREG 516, i.e., core_ff 522, first loads data block [A] from b1_ff 514B (in cycle 3 of the core_clock's first sequence), and then data block [B] from b0_ff 514A, then data block [C] from b1_ff 514B, and finally, data block [D] is loaded twice from b0_ff 514A such that data block [D] is loaded for the used cycle (i.e., the second cycle) and the unused cycle (i.e., the third cycle).

The programming mode with the worst latency (=1.125) and the best skew tolerance (=0.75 of core_clock cycles) is shown in Panel C 550C of FIG. 5B. The core clock synchronizer controller 124 generates b2c_valid_ff 302 such that it is driven LOW in the second core_clock cycle (i.e., cycle 1). The output of the RECEIVE MUXREG 516, i.e., core_ff 522, first loads data block [A] from b1_ff 514B (in cycle 3 of the core_clock's first sequence), and then data block [B] from b0_ff 514A, then data block [C] from b1_ff 514B, and again data block [C] that is not used (in cycle 1 of the core_clock's second sequence, which is the extra cycle unused, hence giving rise to the invalid C or XC data block) and finally, data block [D] from b0_ff 514A (in cycle 2 of the core clock's second sequence). As pointed out earlier, the added latency is the average of the time (in core_clock cycles) from b0_ff or b1_ff to core_ff for all used data. Accordingly, no latency value is shown in any data portion with an X.

Based on the foregoing Detailed Description, it should be appreciated that the synchronizer embodiments of the present invention may be programmed for different latencies and skew tolerances for transferring data across a clock boundary between any two clock domains having a known N:M ratio (e.g., M=N-1). Since the physical implementation of the synchronizer circuitry in both directions of data transfer is essentially the same, a single design may be used for a particular application, thereby minimizing development costs.

Figure 5C:
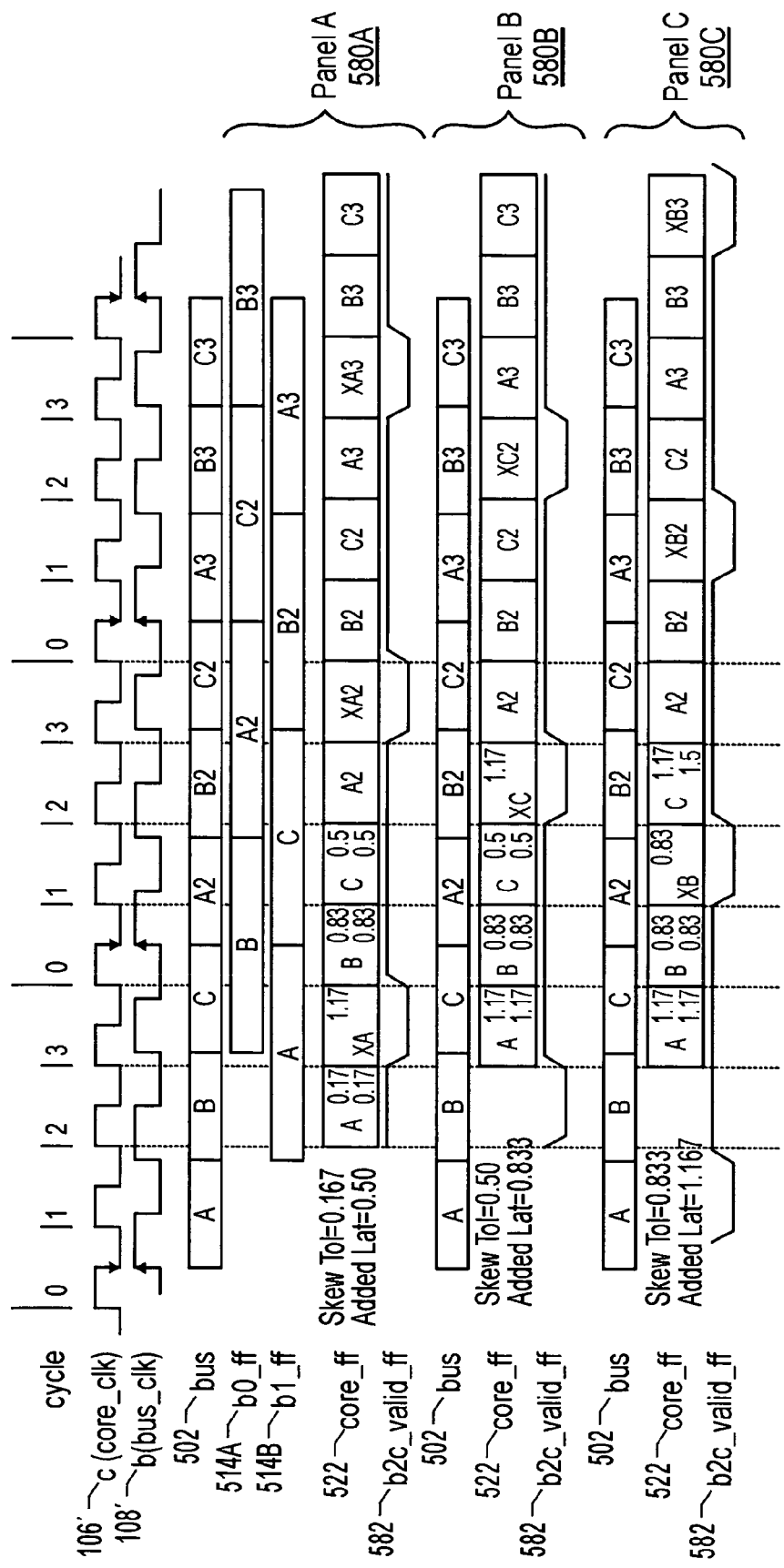
FIG. 5C depicts a timing diagram associated with the synchronizer circuit shown in FIG. 5A, wherein the clock domains have a 4:3 frequency ratio.

FIG. 5C depicts a timing diagram associated with the bus-to-core synchronizer embodiment 500 which illustrates the temporal relationship of the various control signals associated therewith and the effect of different skew tolerances and latencies in the context of a 4:3 clock ratio. Three sequences of bus data 502, [A,B,C], [A2,B2,C2], and [A3,B3,C3], are exemplified, each data block being k-bit wide and available for a particular bus clock cycle, 0 through 2, i.e., data block [A] in cycle 0, data block [B] in cycle 1, and data block [C] in cycle 2. Similar to Panels 550A-550C described above, Panels 580A-580C are provided where data transfers involving skew tolerance of 0.167 and added latency of 0.50, skew tolerance of 0.50 and added latency of 0.833, and skew tolerance of 0.833 and added latency of 1.167 are respectively shown. Under these conditions, the core clock synchronizer controller 124 determines that data transmit operations in cycle 3, cycle 2 and cycle 1, respectively, are invalid. Accordingly, the appropriate b2 c_valid_ff signals 582 are provided by the core clock synchronizer controller so that a particular data block that precedes an invalid cycle is duplicated. As a result, the transmitted bus data sequences are [A,XA,B,C,]/ [A2,XA2,B2,C2,]/[A3,XA3,B3,C3,], [A,B,C,XC]/[A2,B2, C2,XC2]/[A3,B3,C3,XC3], and [A,B,XB,C]/[A2,B2,XB2, C2]/[A3,B3,XB3,C3], respectively, under the three sets of skew/latency combinations illustrated. In particular, it is noteworthy that due to the inversion of the core clock signal, the latencies in the 4:3 frequency mode are very favorable as compared to latencies in instances wherein the core clock signal is not inverted.

Figure 5D:
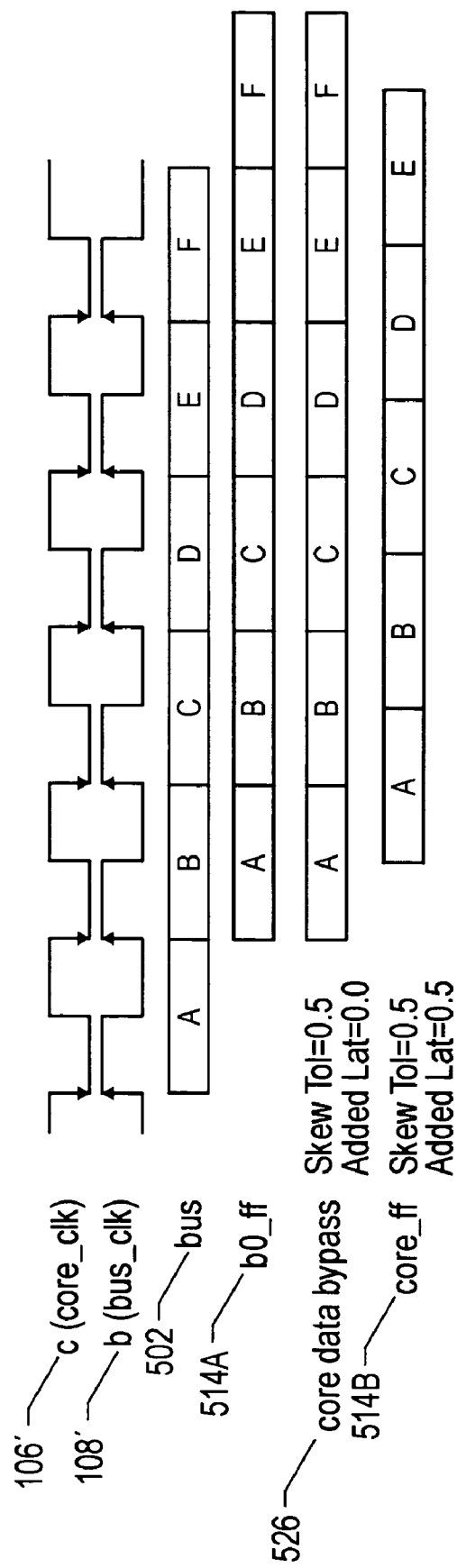
FIG. 5D depicts a timing diagram associated with the synchronizer circuit shown in FIG. 5A, wherein the clock domains have a 1:1 frequency ratio.

FIG. 5D depicts a timing diagram associated with the bus-to-core synchronizer embodiment 500 which illustrates a 1:1 ratio between the clock domains wherein the sequence of bus data 502 is exemplified as [A] [B] [C] [D] [E] [F]. Data transfers involving both the core data bypass 526 and the core_ff signal 522 are depicted. As illustrated, the bus core bypass 526 involves a skew tolerance of 0.5 and added latency of 0.0 and the core_ff signal 522 involves a skew tolerance of 0.50 and added latency of 0.5. Hence, by utilizing the bus data bypass 526 in the synchronizer embodiment 500 for the 1:1 mode, half-a-cycle of latency is saved.

Figure 6:
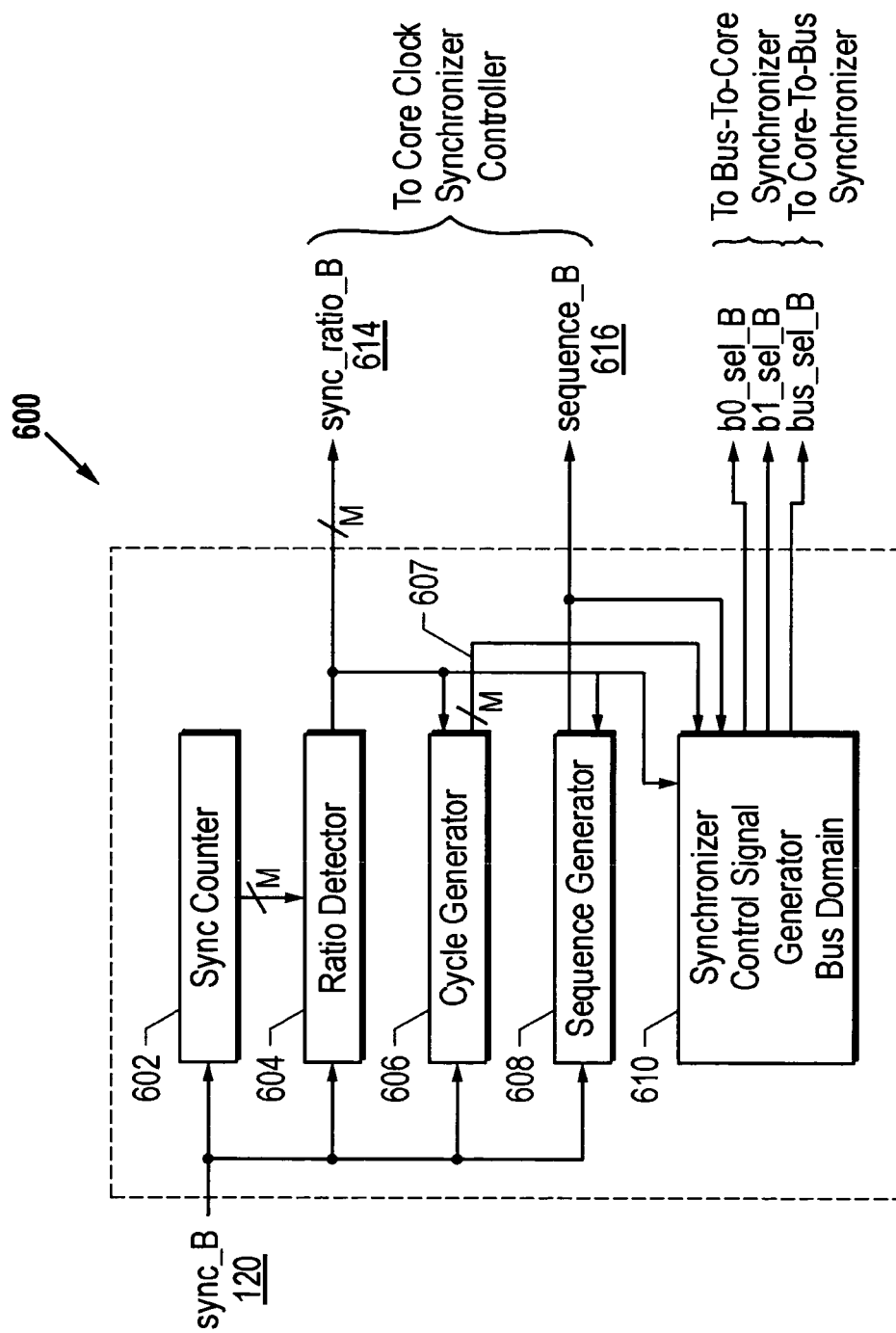
FIG. 6 depicts a block diagram of an embodiment of a bus clock synchronizer controller for controlling bus-to-core synchronizer circuitry.

FIG. 6 depicts a block diagram of an embodiment of a bus clock synchronizer controller portion 600 that is operable as synchronizer controller 122. As illustrated, several functional blocks, which may be implemented using any combination of logic circuitry, are provided as part of the bus clock synchronizer controller portion 600 for generating a number of clock relationship control signals, part of which are used internally to generate a set of bus domain synchronizer control signals towards the bus-to-core and core-to-bus synchronizers. A sync counter block 602 is operable responsive to the sampled SYNC, i.e., sync_B 120, as well as the distributed bus_clock, b 108' (not shown in this FIG. ) for generating an M-bit wide signal that indicates a count of SYNC pulses. In general, M=log2(N+1), where N is the number of cycles in the slow clock domain. For instance, where a clock ratio of [8:7] is employed, M=log2(7+1)=3, i.e., a 3-bit wide signal is generated. A ratio detector block 604 operates responsive to the M-bit wide signal as well as the sync_B signal 120 and b 108' to determine the ratio of the clocks employed in the synchronizer system 100 and generate a clock relationship control signal, designated as sync_ratio_B 614. As will be seen below, this and other clock relationship control signals are provided to a core clock synchronizer controller portion for effectuating the overall programmable controller functionality with respect to the synchronizer system 100.

A cycle generator block 606 is operable responsive to the sync_ratio_B signal 614 as well as the sync_B signal 120 and b 108' for generating a cycle information signal 607 indicative of a current bus clock cycle. A sequence generator block 608 is provided for generating another inter-controller clock relationship control signal, sequence_B 616, in response to the sync_ratio_B signal 614 as well as the sync_B signal 120 and b 108'. It should be appreciated by one skilled in the art that the cycle information and sequence_B signals operate to uniquely identify different bus clocks in the synchronizer system 100.

A bus domain synchronizer control signal generator block 610 is operable responsive to the cycle information signal (which numbers each bus clock cycle), the sequence_B signal (which numbers a sequence of bus clocks) and sync_ratio_B signal 614 for generating a set of bus domain synchronizer control signals, namely, b0_sel_B and b1_sel_B signals towards the bus-to-core synchronizer 105B and bus_sel_B signal towards the core-to-bus synchronizer 105A, which function as described in the foregoing description. The bus domain synchronizer control signal generator block 610 essentially operates to generate a fixed pattern on these control signals for each different bus clock (based on the cycle, sequence and clock ratio inputs).

As alluded to hereinabove, the bus domain synchronizer control signals, b0_sel_B, b1_sel_B, and bus_sel_B, may be registered one or several times for timing reasons before being used by the respective synchronizers as b0_sel_ff 314, b1_sel_ff 316, and bus_sel_ff 318, respectively. Accordingly, the original signals and their registered counterparts may be treated as equivalents for purposes of general operation of the controller arrangement. When the control signals are finally used, b0_sel_ff 314 will be "0" on cycle 0, sequence 0, and alternates to "1", then to "0", et cetera. The b1_sel_ff 316, and bus_sel_ff 318 signals are the inverse of b0_sel_ff (i.e., "1" on cycle 0, sequence 0, and so on), as shown in FIG. 3. These synchronizer control signals do not change for different clock ratios or modes.

Figure 7:
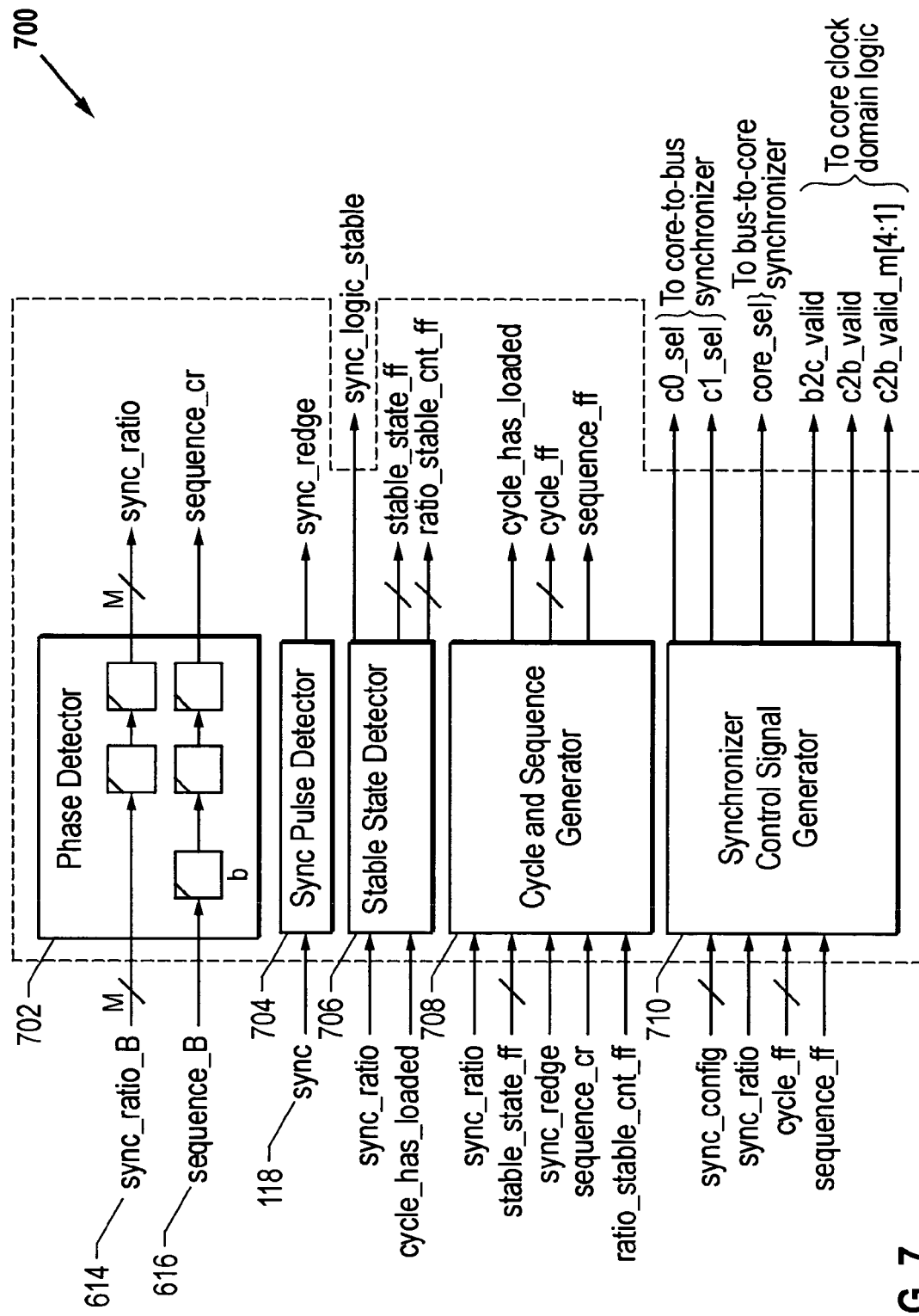
FIG. 7 depicts a block diagram of an embodiment of a core clock synchronizer controller for controlling core-to-bus synchronizer circuitry.

Referring now to FIG. 7, depicted therein is a block diagram of an embodiment of a core clock synchronizer controller portion 700, operable as synchronizer controller 124 of the synchronizer system 100 set forth above. Several functional blocks are illustrated for concisely capturing the overall functionality of the core clock synchronizer portion 700, which essentially operates to generate a set of core domain synchronizer control signals towards the respective synchronizers 105A, 105B, in response to the sampled sync pulse 118, the inter-controller clock relationship control signals 614, 616 and any configuration information provided via SYNC configuration interface 126. As illustrated in FIG. 7, the configuration information is exemplified as a sync_config signal that is supplied to several functional blocks of the core clock synchronizer controller portion 700 that provide additional internal signals for effectuating the synchronizer controller functionality. Again, as with the functional blocks of the bus clock synchronizer controller, the various functional blocks of the core clock synchronizer portion 700 may also be implemented using any combination of logic circuitry.

An internal phase detector block 702 receives the M-bit wide sync_ratio_b 614 from the bus clock synchronizer controller portion 600 to generate an M-bit wide sync_ratio signal by utilizing two flip flop elements to sample the sync_ratio_B signal with the distributed inverted core clock c 106'. Additionally, the phase detector block 702 receives the sequence_B 616 from the bus clock synchronizer controller portion 600. In generating a sequence_cr signal from the sequence_B 616, a first flip flop element samples the sequence_B 616 with the rising edge of the bus clock b 108' and then two flip flop elements sample the signal with the distributed inverted core clock c 106'. The sync pulse 118 provided by the SYNC sampling logic 116 is detected by sync pulse detection block 704 to generate an internal sync signal, sync_redge, that indicates a reliable sync pulse that is not associated with too much clock skew.

A stable state detector block 706 is operable to generate two multi-bit wide internal signals; namely stable_state_ff and ratio_stable_cnt_ff, that provide indications that the skew state and clock ratio relationship between the two clock signals is stable. Further, an external signal, sync_logic_stable, is generated to indicate to the synchronizers that the synchronizing logic is stable. A cycle and sequence generator block 708 is operable responsive to several internal control signals for generating appropriate cycle and sequence signals such as cycle_has_loaded, cycle_ff, and sequence_ff that uniquely identify different core clock cycles.

A core domain synchronizer control signal generator 710 is operable responsive to configuration information via the sync_config signal and internal control signals, including the sync_ratio signal, cycle_ff signal, and sequence_ff signal, for generating a set of core domain synchronizer control signals. With respect to the 5:4 ratio implementation discussed hereinabove, these signals include the c0_sel and c1_sel signals which are provided to the core-to-bus synchronizer and the core-sel signal provided to the bus-to-core synchronizer. Further, a set of transfer control signals, b2c_valid and c2b_valid, and advanced warning signals, c2b_valid_m[4:1], are also provided by the core domain synchronizer control signal generator block 710 to the core clock domain logic circuitry 103A. As with the control signals generated by the bus clock synchronizer controller portion, these various signals may also be registered for timing purposes. Accordingly, the control signals from the core clock synchronizer controller portion may be denoted as their registered equivalents by way of the "_ff" notation.

As discussed previously, the sync_config signal driven to the core domain synchronizer control signal generator block 710 provides an indication of the appropriate skew tolerance and latency values. Based thereon, the various core domain synchronizer control signals may be programmed for different latencies and skew tolerances. By way of example, the effect of programming different values is described below in conjunction with the timing diagrams presented in FIGS. 3, 4B, and 5B.

With particular reference to FIG. 5B, shown therein is how the core_sel_ff 312 and b2c_valid_ff 302 signals can be programmed for different latencies and skew tolerances. As described previously, b0_sel_B and b1_sel_B (generated by the bus clock synchronizer controller portion 600 and may be registered one or more times) have a fixed and known pattern. Accordingly, the core_sel_ff 312 and b2c_valid_ff 302 signals are varied for different conditions (keeping in mind that b2c_valid_ff is the same as b2c_valid registered for timing purposes).

In Panel 550A, which exemplifies the condition of the lowest skew tolerance (0.25 core clock cycle) and lowest latency (0.625 added core clock cycle), core_sel_ff 312 is programmed to sample b1_ff 514B such that data portion A is registered into core_ff 522 in cycle 2 and again in cycle 3 (but not used, hence XA notation). Next, b0_ff 514A is sampled and data portion B is registered into core_ff 522 in cycle 4. Then, data portion C is registered in cycle 0 with the commencement of the following sequence and data portion D is registered in cycle 1. The transfer control signal b2c_valid_ff 302 is programmed such that the core clock domain logic does not use the extra data portion A (i.e., XA block) in cycle 3.

The middle skew tolerance (0.5 core clock cycle) and latency (0.875 added core clock cycle), shown in Panel 550B, is achieved by programming core_sel_ff 312 to capture data portion A in cycle 3, data portion B in cycle 4, data portion C in cycle 0 (commencement of the following sequence), data portion D in cycle 1, and the extra data D again in cycle 2. The transfer control signal b2c_valid_ff 302 is programmed such that the core clock domain logic does not use the extra data portion D (i.e., XD block) in cycle 2.

The highest skew tolerance (0.75 core clock cycle) and latency (1.125 added core clock cycles), shown in Panel 550C of FIG. 5B, is achieved by programming core_sel_ff 312 to capture data portion A in cycle 3, data B in cycle 4, data portion C in cycle 0 (commencement of the following sequence), extra data portion C in cycle 1 and data portion D in cycle 2. The transfer control signal b2c_valid_ff 302 is programmed such that the core clock domain logic does not use the extra data portion C (i.e., XC block) in cycle 1.

Each of the above three different skew tolerances and latency settings are achieved by using three different values on sync_config signal provided via SYNC configuration interface 126 (shown in FIG. 1). A different pattern may be generated for other clock ratios (as indicated by sync_ratio signal), as one skilled in the art should recognize.

Taking reference now to FIG. 4B, shown therein is how the c0_sel_ff 308, c1_sel_ff 310 and c2b_valid_ff 304 signals can be programmed for different latencies and skew tolerances. As described previously, c2b_valid_ff 304 indicates to the core clock domain logic circuitry not to transmit data. Again, it should be kept in mind that c2b_valid_ff is the same as c2b_valid that is registered for timing purposes. The advance warning signals, c2b_valid_m_ff[1:4] 306A-306D (shown in FIG. 3) represent the c2b_valid signal that is advantageously sent one, two, three or more cycles early for performance optimization in the core clock domain logic circuitry.

Since all the core domain synchronizer control signals and the transfer control signals are decoded from cycle and sequence signals (by the synchronizer control generator block 610 shown in FIG. 6), to generate signals early, one merely decodes from an earlier cycle and/or sequence. It should also be noted that low, middle, and high skew tolerances can be programmed for all [N+1:N] ratios. Where a clock ratio of 1:1 is applicable, a normal latency (1 clock added latency) and a low latency (0.5 clock added, if the bus and core clocks are inverted) can be programmed.

Figure 8:
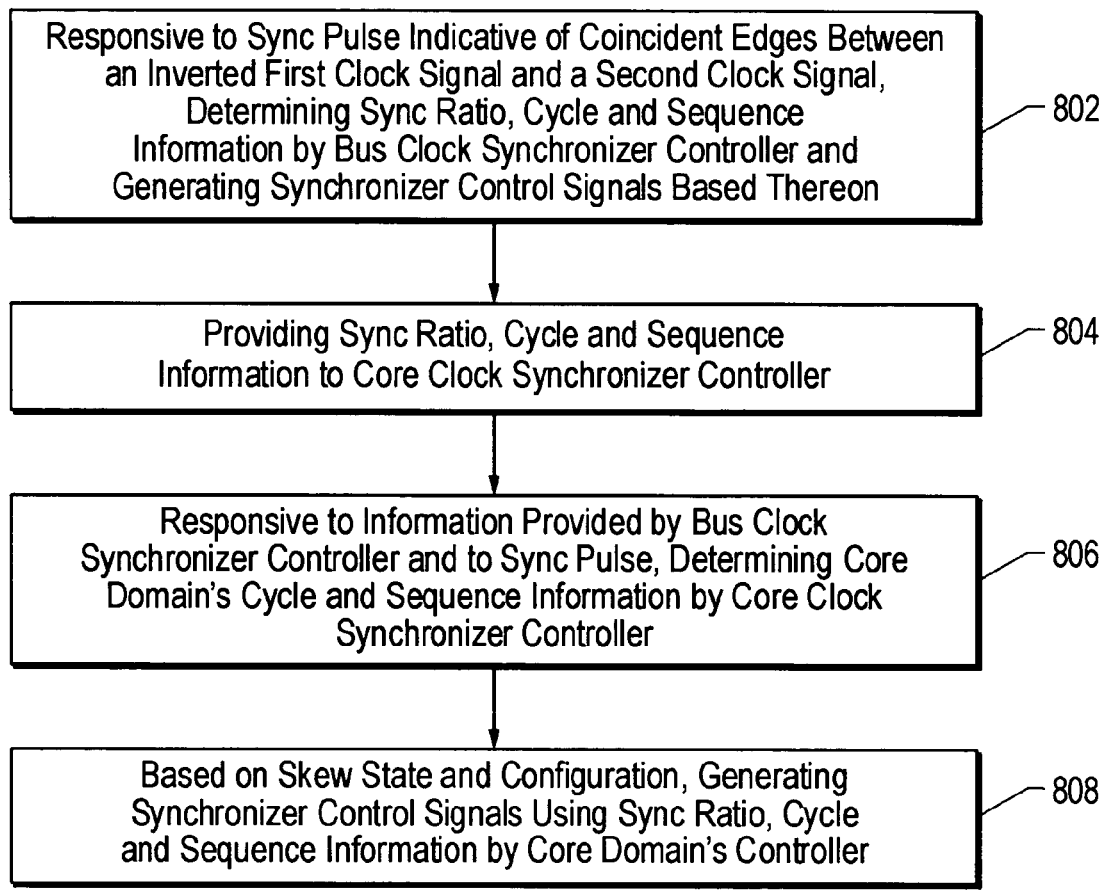
FIG. 8 depicts a flow chart of one embodiment of a method for effectuating data transfers between a first clock domain and a second clock domain.

FIG. 8 depicts a flow chart of the various operations of an embodiment of a synchronizer controller methodology for effectuating data transfer between two clock domains. As set forth in block 802, the bus clock synchronizer controller portion first determines applicable sync ratio, cycle and sequence information for a given clock ratio based on the sampled sync pulse. In particular, the sync pulse is indicative of coincident edges between an inverted core clock signal and a bus clock signal. This information is utilized to generate bus domain synchronizer control signals. Further, the sync ratio and cycle/sequence information is provided as inter-controller clock relationship control signals to the core clock synchronizer controller portion (block 804). Responsive thereto and to the sync pulse, core clock domain's cycle and sequence information is generated by the core clock synchronizer controller (block 806). Based on skew state determination, cycle and sequence information, sync ratio information, and sync configuration information, synchronizer control signals as well as transfer control signals are generated for controlling the data transfer operations via bus-to-core and core-to-bus synchronizer portions (block 808).

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A synchronizer arrangement for effectuating data transfer between a first clock domain and a second clock domain, wherein said first clock domain is operable with a first clock signal and said second clock domain is operable with a second clock signal, said first and second clock signals having a ratio of N first clock cycles to M second clock cycles, where N/M≧1, comprising:
   a first synchronizer for transferring data from said first clock domain to said second clock domain and a second synchronizer for transferring data from said second clock domain to said first clock domain, said first synchronizer comprising first and second transmit circuits clocked by said first clock signal and a receive circuit clocked by said second clock signal, wherein when N/M>1, control signals configure said receive circuit to alternately receive data from said first transmit circuit and said second transmit circuit for output to said second clock domain and when N/M=1, said control signals configure said first transmit circuit to output data directly to said second clock domain;
   a first clock synchronizer controller portion operating to generate a set of first domain synchronizer control signals of said control signals towards said first and second synchronizers, said first clock synchronizer controller portion operating responsive to a set of clock relationship control signals; and
   a second clock synchronizer controller portion operating to generate said set of clock relationship control signals responsive to a SYNC pulse indicative of a coincident edge between an inverted first clock signal and said second clock signal, wherein at least a portion of said clock relationship control signals are used in generating a set of second domain synchronizer control signals towards said first and second synchronizers.

2. The synchronizer arrangement as recited in claim 1, wherein said inverted first clock signal and said second clock signal define a plurality of coincident edges.

3. The synchronizer arrangement as recited in claim 1, further comprising a phase locked loop circuit that, responsive to said first clock signal, generates said inverted first clock signal and said second clock signal.

4. The synchronizer arrangement as recited in claim 1, further comprising a first clock signal distribution tree that, responsive to said first clock signal, generates said inverted first clock signal.

5. The synchronizer arrangement as recited in claim 1, wherein said first clock synchronizer controller portion comprises a core clock synchronizer controller.

6. The synchronizer arrangement as recited in claim 1, wherein said second clock synchronizer controller portion comprises a bus clock synchronizer controller.

7. The synchronizer arrangement as recited in claim 1, wherein said first clock synchronizer controller portion is operable responsive to a second SYNC pulse that is sampled in said first clock domain by said inverted first clock signal.

8. The synchronizer arrangement as recited in claim 7, wherein said first clock synchronizer controller portion comprises a first domain synchronizer control signal generator block, operating responsive to a plurality of internal control signals manufactured based on said set of clock relationship control signals provided by said second clock synchronizer controller portion, for generating said set of first domain synchronizer control signals towards said first and second synchronizers.

9. The synchronizer arrangement as recited in claim 7, wherein said first clock synchronizer controller portion is further operable to generate a set of transfer control signals indicative of when valid data transfer can occur between said first clock domain's circuitry and said second clock domain's circuitry.

10. The synchronizer arrangement as recited in claim 1, wherein said SYNC pulse is sampled in said second clock domain by said second clock signal.

11. The synchronizer arrangement as recited in claim 10, wherein said second clock synchronizer controller portion comprises:
- a sync counter and a ratio detector operating responsive to said sampled SYNC pulse in said second clock domain for determining a sync_ratio signal;
- a cycle generator operating responsive to said sync_ratio signal and said sampled SYNC pulse in said second clock domain for generating a cycle information signal indicative of a current clock cycle;
- a sequence generator operating responsive to said sync_ratio signal and said sampled SYNC pulse in said second clock domain for generating a sequence signal; and
- a second domain synchronizer control signal generator block operating responsive to said sync_ratio signal, said sequence signal and said cycle information signal for generating said set of second domain synchronizer control signals towards said first and second synchronizers, wherein said sync_ratio signal and said sequence signal are provided as said set of clock relationship control signals to said first clock synchronizer controller portion.

12. A computer platform with at least two clock domains, comprising:
- inversion circuitry operable to invert a first clock signal associated with a first clock domain into an inverted first clock signal that is used in effectuating a SYNC pulse during coincident edges of said inverted first clock signal and a second clock signal associated with a second clock domain;
- first clock synchronizer controller circuitry operating in said first clock domain and second clock synchronizer controller circuitry operating in said second clock domain, said first and second clock synchronizer controller circuitry operating responsive to sampled sync pulses based on said SYNC pulse to generate domain synchronizer control signals for effectuating data transfer between said first and second clock domains; and
- a first synchronizer for transferring data from said first clock domain to said second clock domain and a second synchronizer for transferring data from said second clock domain to said first clock domain, said first synchronizer comprising first and second transmit circuits clocked by said first clock signal and a receive circuit clocked by said second clock signal, said first and second clock signals having a ratio of N first clock cycles to M second clock cycles, wherein when N/M>1, said domain synchronizer control signals configure said receive circuit to alternately receive data from said first transmit circuit and said second transmit circuit for output to said second clock domain and when H/M=1, said domain synchronizer control signals configure said first transmit circuit to output data directly to said second clock domain.

13. The computer platform as recited in claim 12, wherein said first clock signal and second clock signals have a ratio selected from the group consisting of 5 first clock signals to 4 second clock signals, 4 first clock signals to 3 second clock signals, and 1 first clock signal to 1 second clock signal.

14. The computer platform as recited in claim 12, wherein said first clock signal is generated by a core clock domain.

15. The computer platform as recited in claim 12, wherein said second clock signal is generated by a bus clock domain.

16. The computer platform as recited in claim 12, wherein said inversion circuitry comprises a clock signal distribution tree.

17. The computer platform as recited in claim 12, wherein said inversion circuitry comprises a phase locked loop circuit.

18. A method for effectuating data transfer between a core clock domain and a bus clock domain, wherein said core clock domain is operable with a core clock signal and said bus clock domain is operable with a bus clock signal, said core and bus clock signals having a ratio of N first clock cycles to M second clock cycles, where N/M≧1, comprising:
- responsive to a SYNC pulse indicative of coincident edges between an inverted core clock signal and said bus clock signal, determining sync ratio, cycle, and sequence information by a bus clock synchronizer controller and generating a plurality of bus domain synchronizer control signals based thereon;
- providing said sync ratio, cycle, and sequence information to a core clock synchronizer controller;
- responsive to said sync ratio and sequence information provided by said bus clock synchronizer controller and to said SYNC pulse, determining core domain's cycle and sequence information by said core clock synchronizer controller;
- based on skew state, sync ratio and sync configuration information, generating a plurality of core domain synchronizer control signals using said cycle and sequence information provided by said core clock synchronizer controller; and
- transferring data from said core clock domain to said bus clock domain using a first synchronizer, wherein when N/M>1, said control signals determine that the data is alternately transferred from first and second transmit circuits clocked by said first clock signal to a receive circuit clocked by said second clock signal for output to said bus clock domain and when N/M=1, said control signals determine that said first transmit circuit outputs data directly to said bus clock domain.

19. The method as recited in claim 18, wherein said inverted core clock signal is generated by a clock signal distribution tree.

20. The method as recited in claim 18, wherein said inverted core clock signal is generated by a phase locked loop circuit.

21. A system for effectuating data transfer between a core clock domain and a bus clock domain, wherein said core clock domain is operable with a core clock signal and said bus clock domain is operable with a bus clock signal, said core and bus clock signals having a ratio of N first clock cycles to M second clock cycles, where N/M≧1, comprising:
- means, responsive to a SYNC pulse indicative of coincident edges between an inverted core clock signal and said bus clock signal, for determining sync ratio, cycle, and sequence information in said bus clock domain;

means for generating a plurality of bus domain synchronizer control signals based on said sync ratio, cycle, and sequence information;

means, responsive to said sync ratio, cycle, and sequence information and to said SYNC pulse, for determining core domain's cycle and sequence information;

means for generating a plurality of core domain synchronizer control signals using said cycle and sequence information provided by said core clock synchronizer controller; and means, responsive to said bus domain synchronizer control signals and said core domain synchronizer control signals, for transferring data from said core clock domain to said bus clock domain using a first synchronizer, wherein when N/M>1, said control signals determine that the data is alternately transferred from first and second transmit circuits clocked by said first clock signal to a receive circuit clocked by said second clock signal for output to said bus clock domain and when N/N=1, said control signals determine that said first transmit circuit outputs data directly to said bus clock domain.

22. The system as recited in claim 21, wherein said inverted core clock signal is generated by a clock signal distribution tree.

23. The system as recited in claim 21, wherein said inverted core clock signal is generated by a phase locked loop circuit.

24. The synchronizer arrangement as recited in claim 1, wherein said coincident edge comprises one of (a) a rising edge in said inverted first clock signal and a falling edge in said second clock signal and (b) a falling edge in said inverted first clock signal and a rising edge in said second clock signal.

25. The synchronizer arrangement as recited in claim 1, wherein each of said first, second and third transfer circuits comprises a multiplexer-register block.

26. The computer platform as recited in claim 12, wherein said coincident edges comprise one of (a) a rising edge in said inverted first clock signal and a falling edge in said second clock signal and (b) a falling edge in said inverted first clock signal and a rising edge in said second clock signal.

27. The computer platform as recited in claim 12, wherein each of said first and second transmit circuits and said receive circuit comprises a multiplexer-register block.

28. The method as recited in claim 18, further comprising generating said SYNC pulse upon coincidence of one of (a) a rising edge in said inverted core clock signal and a falling edge in said bus clock signal and (b) a falling edge in said inverted core clock signal and a rising edge in said bus clock signal, said SYNC pulse being sampled in said bus clock domain and said core clock domain to generate sync_B and sync signals, respectively.

29. The method as recited in claim 18, wherein each of said first and second transmit circuits and said receive circuit comprises a multiplexer-register block.

30. The system as recited in claim 21, further comprising means for generating said SYNC pulse upon coincidence of one of (a) a rising edge in said inverted core clock signal and a falling edge in said bus clock signal and (b) a falling edge in said inverted core clock signal and a rising edge in said bus clock signal, said SYNC pulse being sampled in said bus clock domain and said core clock domain to generate sync_B and sync signals, respectively.

31. The system as recited in claim 21, wherein each of said first and second transmit circuits and said receive circuit comprises a multiplexer-register block.

* * * * *

UNITED STATES PATENT AND TRADEMARK OFFICE
CERTIFICATE OF CORRECTION

PATENT NO.        : 7,436,917 B2
APPLICATION NO.   : 10/901773
DATED             : October 14, 2008
INVENTOR(S)       : Richard W. Adkisson et al.

Page 1 of 1

It is certified that error appears in the above-identified patent and that said Letters Patent is hereby corrected as shown below:

In column 17, line 67, in Claim 12, delete "H/M=1" and insert -- N/M=1 --, therefor.

In column 19, line 21, in Claim 21, delete "N/N=1" and insert -- N/M=1 --, therefor.

Signed and Sealed this

Tenth Day of March, 2009

JOHN DOLL
*Acting Director of the United States Patent and Trademark Office*